US012750182B2

(12) United States Patent
Kim et al.

(10) Patent No.: US 12,750,182 B2
(45) Date of Patent: Sep. 29, 2026

(54) METHOD OF TRANSMITTING AND RECEIVING SS/PBCH AND DEVICE THEREOF

(71) Applicant: LG Electronics Inc., Seoul (KR)

(72) Inventors: Jaehyung Kim, Seoul (KR); Suckchel Yang, Seoul (KR); Seungjin Ahn, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/721,341

(22) PCT Filed: Apr. 25, 2024

(86) PCT No.: PCT/KR2024/005597
§ 371 (c)(1),
(2) Date: Jun. 18, 2024

(87) PCT Pub. No.: WO2024/237518
PCT Pub. Date: Nov. 21, 2024

(65) Prior Publication Data

US 2026/0155929 A1 Jun. 4, 2026

Related U.S. Application Data

(60) Provisional application No. 63/466,234, filed on May 12, 2023.

(30) Foreign Application Priority Data

Sep. 27, 2023 (KR) ........................ 10-2023-0130862

(51) Int. Cl.
*H04L 5/00* (2006.01)
*H04L 1/00* (2006.01)

(52) U.S. Cl.
CPC ............ *H04L 5/005* (2013.01); *H04L 1/0013* (2013.01)

(58) Field of Classification Search
CPC .............................. H04L 5/005; H04L 1/0013
See application file for complete search history.

(56) References Cited

U.S. PATENT DOCUMENTS 11,109,332 B2 * 8/2021 Xue .................. H04W 72/0453
2019/0082422 A1 3/2019 Sun et al.
(Continued)

FOREIGN PATENT DOCUMENTS

KR 10-2019-0100887 A 8/2019
WO WO 2023/041172 A1 3/2023

OTHER PUBLICATIONS

International Search Report and Written Opinion in International Appln. No. PCT/KR2024/005597, mailed on Aug. 19, 2024, 9 pages.

(Continued)

*Primary Examiner* — Jael M Ulysse
(74) *Attorney, Agent, or Firm* — Fish & Richardson P.C.

(57) ABSTRACT

A method performed by a user equipment (UE) according to an embodiment of the present disclosure comprises receiving a Synchronization Signal/Physical Broadcast CHannel (SS/PBCH) block, and receiving configuration information including information related to a Point A. Based on the information related to the Point A, a frequency offset between i) the Point A and ii) a lowest subcarrier of a lowest resource block overlapping with the SS/PBCH block is determined. The lowest subcarrier of the lowest resource block overlaps with the SS/PBCH block after puncturing.

15 Claims, 15 Drawing Sheets

(56) References Cited

U.S. PATENT DOCUMENTS

| | | | | |
|---|---|---|---|---|
| 2021/0058970 | A1* | 2/2021 | Kwak | H04W 72/23 |
| 2021/0127283 | A1* | 4/2021 | Si | H04W 48/12 |
| 2021/0307042 | A1* | 9/2021 | Shin | H04L 27/2602 |
| 2021/0321417 | A1* | 10/2021 | Kim | H04L 5/0048 |
| 2021/0345293 | A1* | 11/2021 | Park | H04L 5/14 |
| 2022/0182212 | A1* | 6/2022 | Takeda | H04W 72/0446 |
| 2023/0039484 | A1* | 2/2023 | Wu | H04W 72/0446 |
| 2023/0379802 | A1* | 11/2023 | Bhatoolaul | H04W 48/12 |
| 2024/0146457 | A1* | 5/2024 | Si | H04L 1/0068 |
| 2024/0284358 | A1* | 8/2024 | Tiirola | H04L 5/0053 |
| 2024/0372666 | A1* | 11/2024 | Choi | H04L 5/0044 |
| 2025/0016661 | A1* | 1/2025 | Desai | H04L 5/0053 |
| 2025/0365118 | A1* | 11/2025 | Hakola | H04L 5/0053 |
| 2026/0040088 | A1* | 2/2026 | Tang | H04W 16/14 |

OTHER PUBLICATIONS

ZTE, "Draft 38.211 CR on common resource block for CSI-RS for mobility," R1-2201145, 3GPP TSG-RAN WG1, Meeting #108-e, e-Meeting, Feb. 21-Mar. 3, 2022, 3 pages.

* cited by examiner (a)

(b)

(a)

(b)

METHOD OF TRANSMITTING AND RECEIVING SS/PBCH AND DEVICE THEREOF

CROSS-REFERENCE TO RELATED APPLICATIONS

This application is a National Stage application under 35 U.S.C. § 371 of International Application No. PCT/KR2024/005597, filed on Apr. 25, 2024, which claims the benefit of U.S. Patent Application No. 63/466,234, filed on May 12, 2023 and Korean Application No. 10-2023-0130862, filed on Sep. 27, 2023. The contents of the prior applications are incorporated by reference herein in their entirety.

TECHNICAL FIELD

The present disclosure relates to a method of transmitting and receiving a SS/PBCH and a device thereof.

BACKGROUND

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

In order to efficiently support various use cases in 5G in terms of cost/complexity, a maximum bandwidth of newly introduced UE types may be reduced. For example, the maximum bandwidth may be reduced to 3 MHz.

If the maximum bandwidth is reduced (e.g., 3 MHz), the UE will not be able to receive the entire SSB. To prevent this, the SSB can be transmitted in a punctured resource region. Point A, which serves as a common reference point for resource block grids, can be obtained based on the lowest subcarrier of the lowest resource block overlapping with the SSB.

SUMMARY

If puncturing is performed as described above, it may be unclear how point A shall be determined/obtained. Specifically, it may be unclear whether point A is defined based on a resource block/subcarrier overlapping with an SSB before puncturing or is defined based on a resource block/subcarrier overlapping with an SSB after puncturing.

An object of the present disclosure is to propose a method to solve the above-mentioned problems.

Technical objects to be achieved in the disclosure are not limited to the aforementioned technical objects, and other technical objects not described above may be evidently understood by a person having ordinary skill in the art to which the disclosure pertains from the following description.

TECHNICAL SOLUTION

A method performed by a user equipment (UE) according to an embodiment of the present disclosure comprises receiving a Synchronization Signal/Physical Broadcast CHannel (SS/PBCH) block and receiving configuration information including information related to a Point A.

Based on the information related to the Point A, a frequency offset between i) the Point A and ii) a lowest subcarrier of a lowest resource block overlapping with the SS/PBCH block is determined.

A time-frequency structure related to the SS/PBCH block is based on a puncturing. The lowest subcarrier of the lowest resource block overlaps with the SS/PBCH block after the puncturing.

The SS/PBCH block after the puncturing may include 12 or 15 resource blocks.

The 12 resource blocks may be remaining blocks other than subcarriers based on subcarrier numbers 0 to 47 and 192 to 239 among subcarriers based on subcarrier numbers 0 to 239 in 4 Orthogonal Frequency Division Multiplexing (OFDM) symbols.

A channel bandwidth related to a cell search based on the SS/PBCH block may be smaller than 5 MHz.

One resource block may be defined as 12 consecutive subcarriers in a frequency domain. A common reference point of resource block grids may be based on the Point A.

The SS/PBCH block after the puncturing may be used by the UE for an initial cell selection.

Common Resource Blocks (CRBs) may be numbered from 0 and upward in a frequency domain. A center of a subcarrier 0 of a CRB 0 may coincide with the Point A.

The lowest resource block may be a CRB that overlaps with a subcarrier 0 of a lowest resource block of the SS/PBCH block after the puncturing.

Physical Resource Blocks (PRBs) may be defined within a BandWidth Part (BWP) which is based on a subset of the CRBs.

A CRB number related to a PRB number may be determined based on a sum of i) the PRB number and ii) a CRB number where the BWP starts based on the CRB 0.

The method may further comprise receiving information related to the SS/PBCH block.

The information related to the SS/PBCH block may be received based on a broadcast signaling.

The information related to the SS/PBCH block may include information on at least one of i) a number of resource blocks related to the SS/PBCH block after the puncturing and/or ii) a location related to the resource blocks.

Based on before the information related to the SS/PBCH block is received, a number of resource blocks related to the SS/PBCH block after the puncturing may be determined based on a default configuration.

A user equipment (UE) according to another embodiment of the present disclosure comprises one or more transceivers, one or more processors, and one or more memories connected to the one or more processors and configured to store instructions.

The instructions, based on being executed by the one or more processors, configure the one or more processors to perform all steps of a method according to any one of claims 1 to 13.

A device according to another embodiment of the present disclosure comprises one or more memories and one or more processors operably connected to the one or more memories.

The one or more memories are configured to store instructions based on being executed by the one or more processors, and the instructions are configured to allow the one or more processors to perform all steps of any one of the methods.

One or more non-transitory computer readable mediums according to another embodiment of the present disclosure stores instructions. The instructions executable by one or more processors are configured to allow the one or more processors to perform all steps of any one of the methods.

A method performed by a base station according to another embodiment of the present disclosure comprises transmitting a Synchronization Signal/Physical Broadcast CHannel (SS/PBCH) block and transmitting configuration information including information related to a Point A.

Based on the information related to the Point A, a frequency offset between i) the Point A and ii) a lowest subcarrier of a lowest resource block overlapping with the SS/PBCH block is determined.

A time-frequency structure related to the SS/PBCH block is based on a puncturing. The lowest subcarrier of the lowest resource block overlaps with the SS/PBCH block after the puncturing.

A base station operating in a wireless communication according to another embodiment of the present disclosure comprises one or more transceivers, one or more processors, and one or more memories connected to the one or more processors and configured to store instructions.

The instructions, based on being executed by the one or more processors, are configured to allow the one or more processors to perform all steps of any one of the methods.

According to embodiments of the present disclosure, Point A which is a common reference point of resource block grids is defined based on SS/PBCH block after puncturing. Therefore, the uncertainty of criterion related to identification of frequency resources used by UEs supporting a channel bandwidth less than 5 MHz can be solved.

Further, different criteria (different Point A) can be prevented from being used to determine a location of frequency resources in a channel bandwidth in which the SS/PBCH block is transmitted based on the puncturing. Hence, reliability of signaling based on allocation of the frequency resources and the allocated frequency resources can be secured.

In addition, embodiments of the present disclosure can contribute to expanding application use cases of the NR system by resolving problems that may arise when supporting a narrowband UE/spectrum scenario.

Effects which may be obtained from the disclosure are not limited by the above effects, and other effects that have not been mentioned may be clearly understood from the following description by those skilled in the art to which the disclosure pertains.

DETAILED DESCRIPTION

Figure 1:
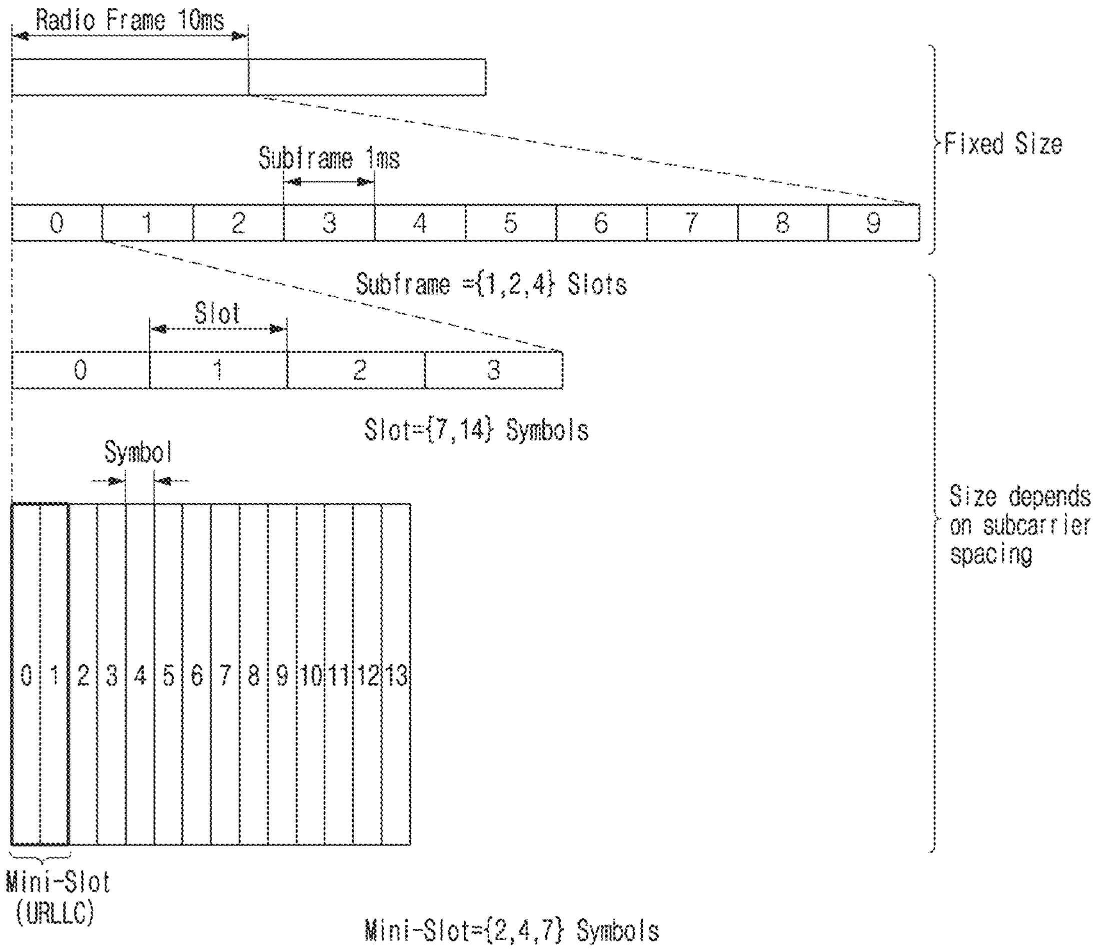
FIG. 1 illustrates an example of a frame structure in an NR system.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the disclosure is not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system.

Matters disclosed in a standard document opened before the disclosure may be referred to for a background art, terms, omissions, etc., used for describing the disclosure. For example, the following documents may be referred to.

3GPP NR

- 3GPP TS 38.211: Physical channels and modulation
- 3GPP TS 38.212: Multiplexing and channel coding
- 3GPP TS 38.213: Physical layer procedures for control
- 3GPP TS 38.214: Physical layer procedures for data
- 3GPP TS 38.215: Physical layer measurements
- 3GPP TS 38.300: NR and NG-RAN Overall Description
- 3GPP TS 38.304: User Equipment (UE) procedures in idle mode and in RRC inactive state
- 3GPP TS 38.321: Medium Access Control (MAC) protocol
- 3GPP TS 38.322: Radio Link Control (RLC) protocol
- 3GPP TS 38.323: Packet Data Convergence Protocol (PDCP)
- 3GPP TS 38.331: Radio Resource Control (RRC) protocol
- 3GPP TS 37.324: Service Data Adaptation Protocol (SDAP)
- 3GPP TS 37.340: Multi-connectivity; Overall description
- 3GPP TS 23.287: Application layer support for V2X services; Functional architecture and information flows
- 3GPP TS 23.501: System Architecture for the 5G System
- 3GPP TS 23.502: Procedures for the 5G System
- 3GPP TS 23.503: Policy and Charging Control Framework for the 5G System; Stage 2
- 3GPP TS 24.501: Non-Access-Stratum (NAS) protocol for 5G System (5GS); Stage 3
- 3GPP TS 24.502: Access to the 3GPP 5G Core Network (5GCN) via non-3GPP access networks
- 3GPP TS 24.526: User Equipment (UE) policies for 5G System (5GS); Stage 3

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1. μ for a bandwidth part and the cyclic prefix are obtained from RRC parameters provided by the BS.

TABLE 1

| μ | $\Delta f = 2^{\mu} * 15$ [kHz] | Cyclic Prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as two types of frequency ranges FR1 and FR2. FR1 may denote sub 6 GHz range, and FR2 may denote above 6 GHz range and may mean millimeter wave (mmW).

Table 2 below shows an example of definition of the NR frequency band.

TABLE 2

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max}N_f/100)$. $T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

Uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \{0, \ldots, N_{subframe}^{slots,\mu} - 1\}$$

within a subframe and are numbered in increasing order of $$n_{s,f}^\mu \in \{0, \ldots, N_{frame}^{slots,\mu} - 1\}$$

within a radio frame. One slot consists of consecutive OFDM symbols of $$N_{symb}^\mu, \ and \ N_{symb}^\mu$$

is determined depending on a numerology used and slot configuration. The start of slots $$n_s^\mu$$

in a subframe is aligned in time with the start of OFDM symbols $$n_s^\mu N_{symb}^\mu$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per subframe in a normal CP. Table of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | |
|---|---|---|---|
| 2 | 12 | 40 | 4 |

FIG. 1 illustrates an example of a frame structure in a NR system. FIG. 1 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 1, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

The physical resources that may be considered in the NR system are described in detail below.

Figure 2:
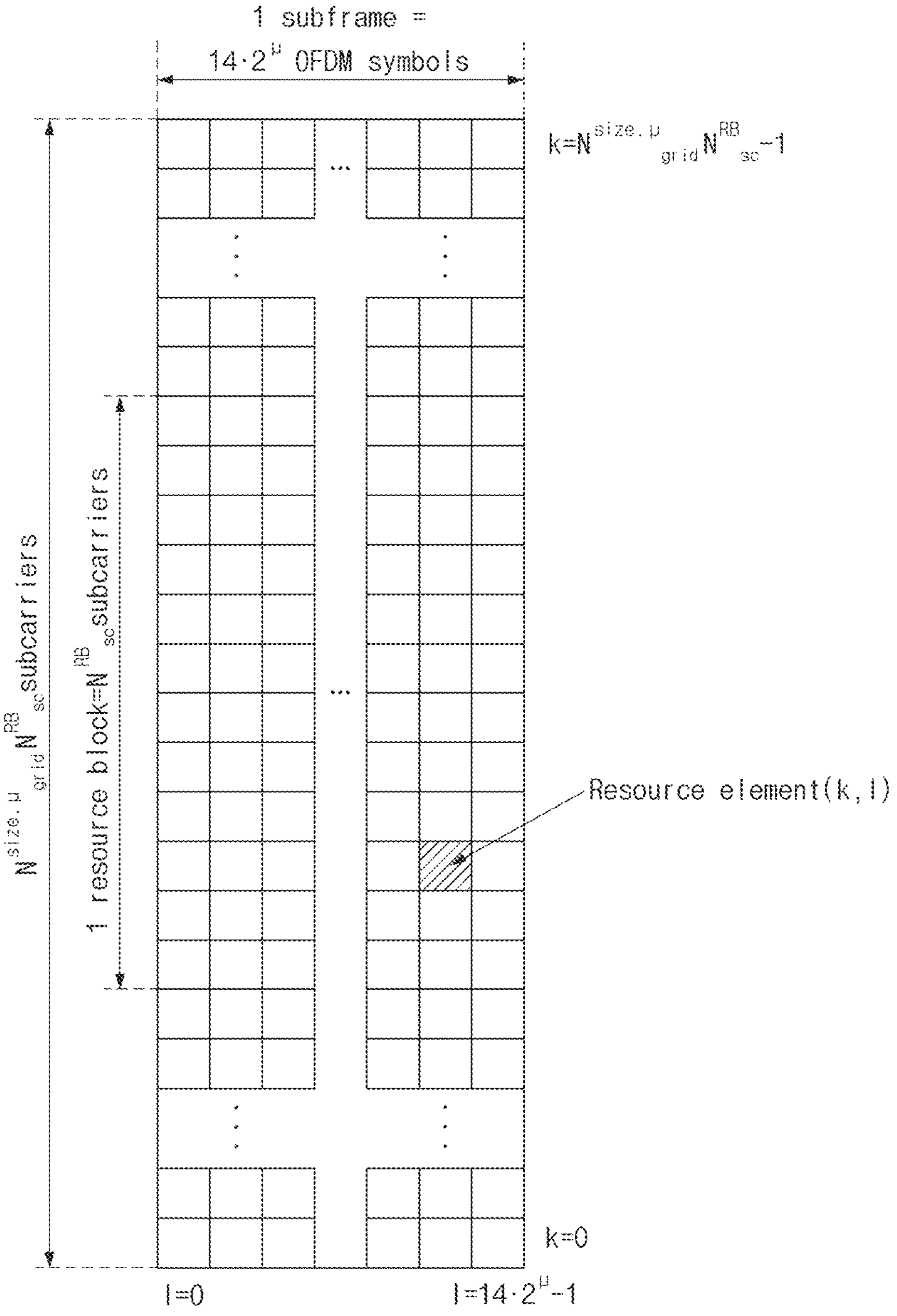
FIG. 2 illustrates an example of a resource grid in NR.

FIG. 2 illustrates an example of a resource grid supported in NR.

Referring to FIG. 2, for each subcarrier spacing configuration and carrier, a resource grid of $N^{size,\mu}_{grid} * N^{RB}_{sc}$ subcarriers and 14.24 OFDM symbols is defined, where $N^{size,\mu}_{grid}$ is indicated by RRC signaling from the BS. $N^{size,\mu}_{grid}$ may change between uplink and downlink as well as the subcarrier spacing configuration μ.

Each element of the resource grid for the numerology μ and the antenna port p is called a resource element and is uniquely identified by an index pair (k, $\bar{l}$), where $$k = 0, \ldots, N_{RB}^\mu N_{sc}^{RB} - 1$$

is an index on a frequency domain, and $$\bar{l} = 0, \ldots, 2^\mu N_{symb}^{(\mu)} - 1$$

refers to a location of a symbol in a subframe. The index pair (k, l) is used to refer to a resource element in a slot, where l=0, . . . , $$N_{symb}^\mu - 1.$$

The resource element $(k, \bar{l})$ for the numerology u and the antenna port p corresponds to a complex value $$a_{k,\bar{l}}^{(p,\mu)}.$$

When there is no risk for confusion or when a specific antenna port or numerology is not specified, the indices p and u may be dropped, and as a result, the complex value may be $$a_{k,\bar{l}}^{(p)} \text{ or } a_{k,\bar{l}}.$$

Further, a physical resource block is defined as $$N_{sc}^{RB} = 12$$

consecutive subcarriers in the frequency domain.

Considering that the UE may not be able to support a wide bandwidth to be supported in the NR system at one time, the UE may be configured to operate in a part of a frequency bandwidth of a cell (hereinafter, referred to as a bandwidth part (BWP)).

Resource blocks of the NR system include physical resource blocks defined in the bandwidth part and common resource blocks that are numbered upward from 0 in a frequency domain for the subcarrier spacing configuration u.

Point A serves as a common reference point of a resource block grid and may be obtained as follows.

- offsetToPointA for a PCell downlink represents a frequency offset between point A and the lowest subcarrier of the lowest resource block that overlaps with the SS/PBCH block used by the UE for initial cell selection, and is expressed in units of resource blocks assuming 15 kHz subcarrier spacing for FR1 and 60 kHz subcarrier spacing for FR2;
- absoluteFrequencyPointA represents the frequency-location of point A expressed as in absolute radio-frequency channel number (ARFCN);

The common resource blocks are numbered from 0 and upwards in the frequency domain for subcarrier spacing configuration u.

The center of subcarrier 0 of common resource block 0 for the subcarrier spacing configuration u coincides with "point A". A common resource block number $$n_{CRB}^{\mu}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to point A so that k=0 corresponds to a subcarrier centered around point A. Physical resource blocks are defined within a bandwidth part (BWP) and are numbered from 0 to $$N_{BWP,j}^{size} - 1,$$

where i is a number of the BWP. A relation between the physical resource block $n_{PRB}$ in $BWP^i$ and the common resource block $n_{CRB}$ may be given by the following Equation 2.

$$n_{CRB} = n_{PRB} + N_{BWP,i}^{start} \quad \text{[Equation 2]}$$

Here, $$N_{BWP,i}^{start}$$

may be the common resource block where the BWP starts relative to the common resource block 0.

Bandwidth Part (BWP)

In the NR system, up to 400 MHz can be supported per one carrier. If a UE operating in such a wideband carrier is always operated with a radio frequency (RF) module for all carriers turned on, battery consumption by the UE may increase. Alternatively, considering several use cases (e.g., eMBB, URLLC, mMTC, V2X, etc.) that are operated in one wideband carrier, different numerologies (e.g., subcarrier spacing) may be supported for each frequency band in the corresponding carrier. Alternatively, a capability for a maximum bandwidth may be different for each UE. Considering this, a base station (BS) may indicate the UE to operate only in a partial bandwidths rather than the entire bandwidth of a wideband carrier, and the partial bandwidth is defined as a bandwidth part (BWP). The BWP in the frequency domain is a subset of continuous common resource blocks defined for numerology μi within a bandwidth part i on the carrier, and one numerology (e.g., subcarrier spacing, CP length, slot/mini-slot duration) may be configured.

The BS may configure one or more BWPs within one carrier configured for the UE. Alternatively, if UEs are concentrated on a specific BWP, some UEs may be shifted to different BWPs for load balancing. Alternatively, both BWPs may be configured in the same slot excluding some center spectrums of the entire bandwidth considering frequency domain inter-cell interference cancellation between contiguous cells, etc. That is, the BS can configure at least one DL/UL BWP to a UE associated with the wideband carrier, can activate at least one DL/UL BWP of configured DL/UL BWP(s) at a specific time (by L1 signaling which is the physical layer control signal, MAC control element (CE) which is the MAC layer control signal, or RRC signaling, etc.) and indicate to switch to other configured DL/UL BWP (by L1 signaling, MAC CE, or RRC signaling, etc.), or can the UE to switch to a given DL/UL BWP if a timer value is set and a timer is expired. The activated DL/UL BWP is defined as an active DL/UL BWP. The UE may not receive configuration for the DL/UL BWP when the UE is in an initial access procedure or RRC connection of the UE is not set up yet. In this situation, a DL/UL BWP assumed by the UE is defined as an initial active DL/UL BWP.

Physical Channel and General Signal Transmission

Figure 3:
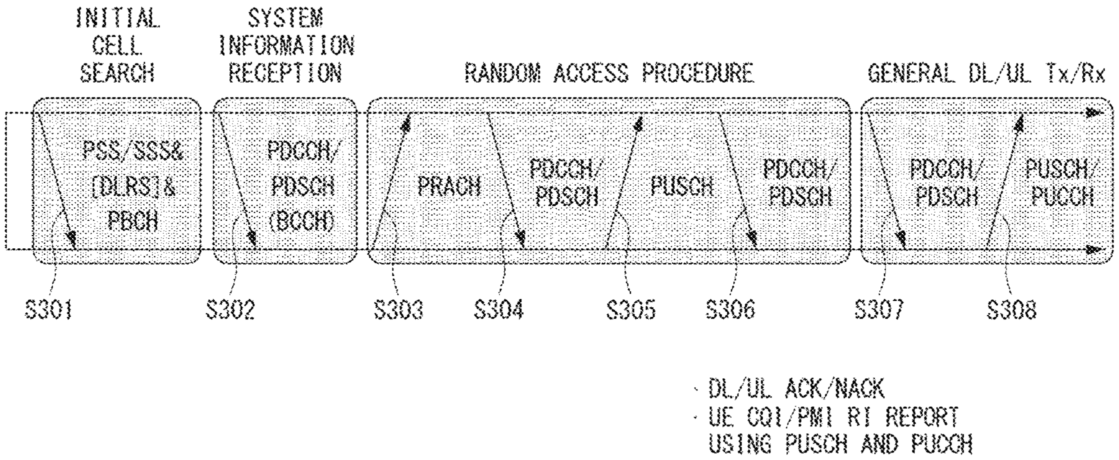
FIG. 3 illustrates physical channels and general signal transmission used in a 3GPP system.

FIG. 3 illustrates physical channels and general signal transmission used in 3GPP systems. In a wireless communication system, the UE receives information from the eNB through downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S301). To this end, the UE may receive a primary synchronization signal (PSS) and a (secondary synchronization signal (SSS) from the eNB and synchronize with the eNB and acquire information such as a cell ID or the like. Thereafter, the UE may receive a physical broadcast channel (PBCH) from the eNB and acquire in-cell broadcast information. The UE receives a downlink reference signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S302).

When there is no radio resource first accessing the eNB or for signal transmission, the UE may perform a Random Access Procedure (RACH) to the eNB (S303 to S306). To this end, the UE may transmit a specific sequence to a preamble through a Physical Random Access Channel (PRACH) (S303 and S305) and receive a response message (Random Access Response (RAR) message) for the preamble through the PDCCH and a corresponding PDSCH. In the case of a contention based RACH, a Contention Resolution Procedure may be additionally performed (S306).

The UE that performs the above procedure may then perform PDCCH/PDSCH reception (S307) and Physical Uplink Shared Channel (PUSCH)/Physical Uplink Control Channel (PUCCH) transmission (S308) as a general uplink/downlink signal transmission procedure. In particular, the UE may receive Downlink Control Information (DCI) through the PDCCH.

The UE monitors a set of PDCCH candidates in monitoring occasions configured to one or more control element sets (CORESETs) on a serving cell based on corresponding search space configurations. The set of PDCCH candidates to be monitored by the UE is defined in terms of search space sets, and the search space set may be a common search space set or a UE-specific search space set. The CORESET consists of a set of (physical) resource blocks with a duration of one to three OFDM symbols. A network may configure the UE to have a plurality of CORESETs. The UE monitors PDCCH candidates in one or more search space sets. Here, the monitoring means attempting to decode PDCCH candidate(s) in a search space. If the UE succeeds in decoding one of the PDCCH candidates in a search space, the UE determines that a PDCCH has been detected from the PDCCH candidates and performs PDSCH reception or PUSCH transmission based on DCI within the detected PDCCH.

The PDCCH may be used to schedule DL transmissions on PDSCH and UL transmissions on PUSCH. The DCI on the PDCCH includes downlink assignment (i.e., DL grant) related to a downlink shared channel and including at least a modulation and coding format and resource allocation information, or an uplink grant (UL grant) related to an uplink shared channel and including a modulation and coding format and resource allocation information. The DCI has different formats depending on its purpose.

The control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Synchronization Signal Block (SSB) Transmission and Related Operation

Figure 4:
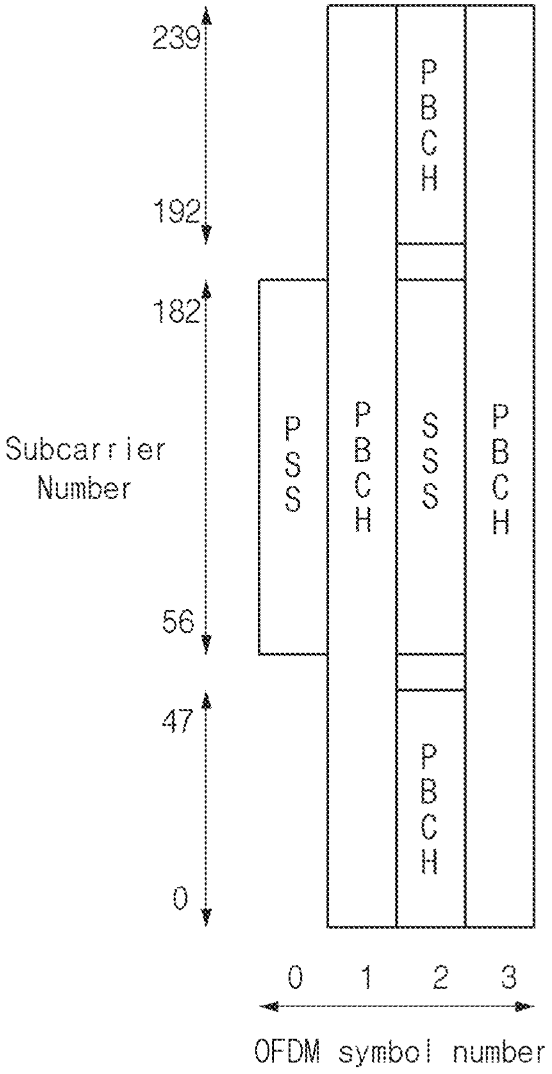
FIG. 4 is a diagram illustrating an SSB structure to which a method proposed in the present disclosure is applicable.

FIG. 4 is a diagram illustrating an SSB structure to which a method proposed in the present disclosure is applicable. The UE may perform cell search, system information acquisition, beam alignment for initial access, DL measurement, and the like based on an SSB. The SSB is interchangeably used with a synchronization signal/physical broadcast channel (SS/PBCH) block.

Referring to FIG. 4, the SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers.

Polar coding and quadrature phase shift keying (QPSK) are applied to the PBCH. The PBCH consists of data REs and demodulation reference signal (DMRS) REs every OFDM symbol. Three DMRS REs are present per RB, and three data REs are present between the DMRS REs.

Figure 5:
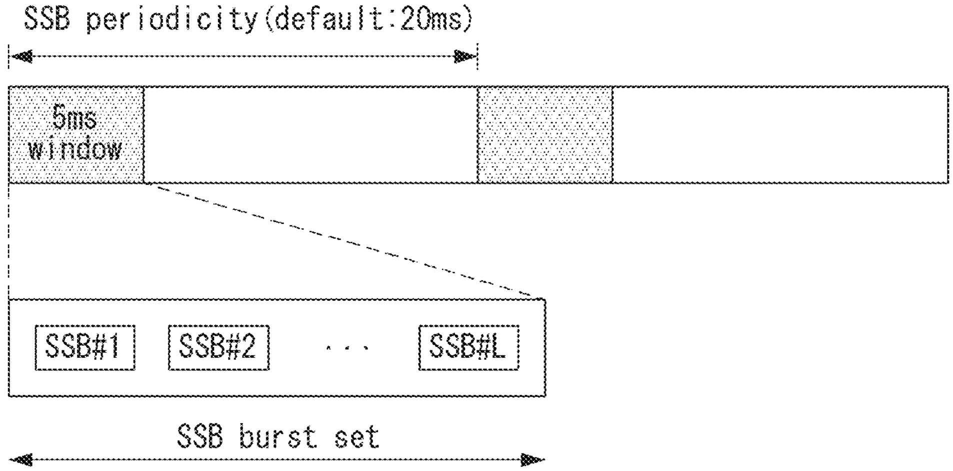
FIG. 5 illustrates SSB transmission to which a method proposed in the present disclosure is applicable.

FIG. 5 illustrates SSB transmission to which a method proposed in the present disclosure is applicable.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at a beginning part of the SSB periodicity. The SSB burst set includes a 5 ms time window (i.e., half-frame), and the SSB may be transmitted up to N times within the SSB burst set. The maximum transmission number L of the SSB may be given as follows according to a frequency band of a carrier. One slot includes up to two SSBs.

For frequency range up to 3 GHZ, L=4

For frequency range from 3 GHz to 6 GHz, L=8

For frequency range from 6 GHz to 52.6 GHz, L=64

A time location of SSB candidates within the SSB burst set may be defined depending on SCS as follows. The time location of the SSB candidates is indexed (SSB index) from 0 to L−1 based on time order within the SSB burst set (i.e., half-frame).

A plurality of SSBs may be transmitted within a frequency span of a carrier. Physical layer cell identifiers of these SSBs need not be unique, and other SSBs may have other physical layer cell identifiers.

The UE may acquire DL synchronization by detecting the SSB. The UE can identify a structure of the SSB burst set based on the detected SSB (time) index, and thus can detect a symbol/slot/half-frame boundary. The number of the frame/half-frame to which the detected SSB belongs may be identified using system frame number (SFN) information and half-frame indication information.

The contents described above can be combined and applied to methods described below in the present disclosure, or can be supplemented to clarify technical features of the methods described in the present disclosure. Methods described below are merely distinguished for convenience of explanation. Thus, it is obvious that partial configuration of any method can be substituted or combined with partial configuration of another method.

Technical Terms Used in the Present Disclosure

UE: User Equipment
SSB: Synchronization Signal Block
MIB: Master Information Block
RMSI: Remaining Minimum System Information
FR1: Frequency domain with frequency range of 1.6 GHz or less (e.g., 450 MHz to 6,000 MHz)
FR2: Millimeter wave (mmWave) domain with frequency range of 2.24 GHz or higher (e.g., 24,250 MHz to 52,600 MHz)
BW: Bandwidth
BWP: Bandwidth Part
RNTI: Radio Network Temporary Identifier
CRC: Cyclic Redundancy Check
SIB: System Information Block
SIB1: SIB1 for NR devices=RMSI (Remaining Minimum System Information). It broadcasts information, etc. necessary for cell access of an NR UE.
CORESET (COntrol REsource SET): Time/frequency resource in which an NR UE tries candidate PDCCH decoding
CORESET #0: CORESET for Type0-PDCCH CSS set for NR devices (configured in MIB)
Type0-PDCCH CSS set: a search space set in which an NR UE monitors a set of PDCCH candidates for a DCI format with CRC scrambled by a SI-RNTI
MO: PDCCH Monitoring Occasion for Type0-PDCCH CSS set
SIB1-R: (additional) SIB1 for reduced capability NR devices. It may be limited when it is generated with a separate TB from SIB1 and is transmitted on a separate PDSCH.
CORESET #0-R: CORESET #0 for reduced capability NR devices
Type0-PDCCH-R CSS set: a search space set in which a redcap UE monitors a set of PDCCH candidates for a DCI format with CRC scrambled by a SI-RNTI
MO-R: PDCCH Monitoring Occasion for Type0-PDCCH CSS set
Cell defining SSB (CD-SSB): SSB including RMSI scheduling information among NR SSBs
Non-cell defining SSB (non-CD-SSB): SSB that has been deployed on NR sync raster, but does not include RMSI scheduling information of a corresponding cell for measurement. But, the SSB may include information informing a location of cell defining SSB.
SCS: subcarrier spacing
SI-RNTI: System Information Radio-Network Temporary Identifier
Camp on: "Camp on" is the UE state in which the UE stays on a cell and is ready to initiate a potential dedicated service or to receive an ongoing broadcast service.
TB: Transport Block
RSA (Redcap standalone): Cell supporting only redcap device or service
SIB1(-R)-PDSCH: PDSCH transmitting SIB1(-R)
SIB1(-R)-DCI: DCI scheduling SIB1(-R)-PDSCH. DCI format 1_0 with CRC scrambled by SI-RNTI.
SIB1(-R)-PDCCH: PDCCH transmitting SIB1(-R)-DCI
FDRA: Frequency Domain Resource Allocation
TDRA: Time Domain Resource Allocation
RA: Random Access
MSGA: preamble and payload transmissions of the random access procedure for 2-step RA type.
MSGB: response to MSGA in the 2-step random access procedure. MSGB may consist of response(s) for contention resolution, fallback indication(s), and backoff indication.
RO-N: RACH Occasion (RO) for normal UE 4-step RACH and 2-step RACH (if configured)
RO-N1, RO-N2: If separate RO is configured for normal UE 2-step RACH, it is divided into RO-N1 (4-step) and RO-N2 (2-step).
RO-R: RACH Occasion (RO) separately configured from RO-N for redcap UE 4-step RACH and 2-step RACH (if configured)
RO-R1, RO-R2: If separate RO is configured for redcap UE 2-step RACH, it is divided into RO-R1 (4-step) and RO-R2 (2-step).
PG-R: MsgA-Preambles Group for redcap UEs
RAR: Random Access Response
RAR window: the time window to monitor RA response(s)
FH: Frequency Hopping
iBWP: initial BWP
iBWP-DL (-UL): initial DL (UL) BWP
iBWP-DL (-UL)-R: (separate) initial DL (UL) BWP for RedCap
CS: Cyclic shift
NB: Narrowband
TO: Traffic Offloading
mMTC; massive Machine Type Communications
eMBB: enhanced Mobile Broadband Communication
URLLC: Ultra-Reliable and Low Latency Communication
RedCap: Reduced Capability
eRedCap: enhanced RedCap
FDD: Frequency Division Duplex
HD-FDD: Half-Duplex-FDD
DRX: Discontinuous Reception
RRC: Radio Resource Control
RRM: Radio Resource Management
IWSN: Industrial Wireless Sensor Network
LPWA: Low Power Wide Area
RB: Resource Block
CCE: Control Channel Element
AL: Aggregation Level
PRG: Physical Resource-block Group
DFT-s-OFDM: DFT-spread OFDM
PBCH: Physical Broadcast Channel
A-PBCH: Additional PBCH
BD: blind detection
EPRE: Energy Per RE
SNR: Signal-to-Noise Ratio
TDM: Time Division Multiplexing
DMRS: DeModulation Reference Signal
TDD: Time Division Duplex In the present disclosure, '( )' can be interpreted as both when excluding content in parentheses and when including content in parentheses.

In the present disclosure, '/' can be interpreted as when including all the contents separated by '/' (and), or when including only a part of the separated contents (or).

The 5G wireless communication system is characterized by effectively supporting use cases, such as mMTC, eMBB, and URLLC, compared to the previous generation wireless communication system (e.g., LTE, GSM). Due to these advantages, the 5G wireless communication system is expected to create new use cases and gradually replace the previous generation wireless communication system for various use cases.

Features such as enhanced low latency, high reliability, massive connection, etc. of the 5G wireless communication system can be applied to use cases (hereinafter, NB use cases) that have been previously supported in narrowband (NB), as follows.

Examples of Narrowband Based Use Cases (NB Use Cases)

i) Railway mobile communication
ii) Utility/infrastructure network
iii) Mobile communication for public safety These NB use cases have been previously supported at a bandwidth of about 3 MHz in a frequency band of less than 1 GHz using the previous generation wireless communication system. In the same manner, when the 5G wireless communication system intends to support the NB use cases, the NB use cases may be supported, for example, at the similar frequency bandwidth (about 3 MHz and below 5 MHz) in the same frequency band (below 1 GHz). However, since a minimum channel BW supported by the current 5G NR standard is 5 MHz, a channel bandwidth of less than 5 MHz shall first be supported.

Example of 5G NR Frequency Band for NB Use Case Support (TS38.101-1)

NB use cases can be supported in the following NR operating frequency band defined in NR standard TS38.101-1.

TABLE 5

| NR operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
|---|---|---|---|
| n8 | 880 MHz-915 MHz | 925 MHz-960 MHz | FDD |
| n26 | 814 MHz-849 MHz | 859 MHz-894 MHz | FDD |
| n28 | 703 MHz-748 MHz | 758 MHz-803 MHz | FDD |
| n100 | 874.4 MHz-880 MHz | 919.4 MHz-925 MHz | FDD |

Table 5 shows UL/DL operating band defined per NR operating band in Frequency Range1 FR1.

Example of Definition of Channel BW of Less than 5 MHz for NB Use Case Support

Table 6 shows an example of the maximum number of configurable RBs ($N_{RB}$) for each UE channel BW. According to Table 6, in order to support the NB use cases based on 5G NR, 3 MHz UE channel BW is defined and the maximum number of configurable RBs ($N_{RB}$) in the 3 MHz UE channel BW is defined to 15, and in this case, a resource utilization ratio (or RU) (%) is defined.

TABLE 6

| UE channel BW | 3 MHz | 5 MHz | 10 MHz | 15 MHz | 20 MHz | 25 MHz | 30 MHz | 40 MHz | 50 MHz |
|---|---|---|---|---|---|---|---|---|---|
| $N_{RB}$ | 15 | 25 | 52 | 79 | 106 | 133 | 160 | 216 | 270 |
| RU | 0.9 | 0.9 | 0.936 | 0.948 | 0.954 | 0.958 | 0.96 | 0.972 | 0.972 |

Further, for newly defined 3 MHz UE channel BW, considering interference between contiguous channels and a resource utilization ratio, other $N_{RB}$ values shown in Table 7 below can be defined and used.

TABLE 7

| SCS (kHz) | 3 MHZ $N_{RB}$ | $N_{RB}$ | $N_{RB}$ | $N_{RB}$ | $N_{RB}$ |
|---|---|---|---|---|---|
| 15 | 12 | 13 | 14 | 15 | 16 |
| RU (%) | 0.72 | 0.78 | 0.84 | 0.9 | 0.96 |

For example, the channel BW/$N_{RB}$ may be applied for both DL and UL as the same value. For example, the channel BW/$N_{RB}$ may be configured/supported separately/independently for DL and UL. A method according to the second example may be applied to the following situation. The method can be used to when intending to apply conditions where additional DFT precoding is applicable only to the UL when determining the $N_{RB}$ values, while supporting maximum channel BW/$N_{RB}$ values in both DL and UL considering interference between contiguous channels and the resource utilization ratio.

Figure 6:
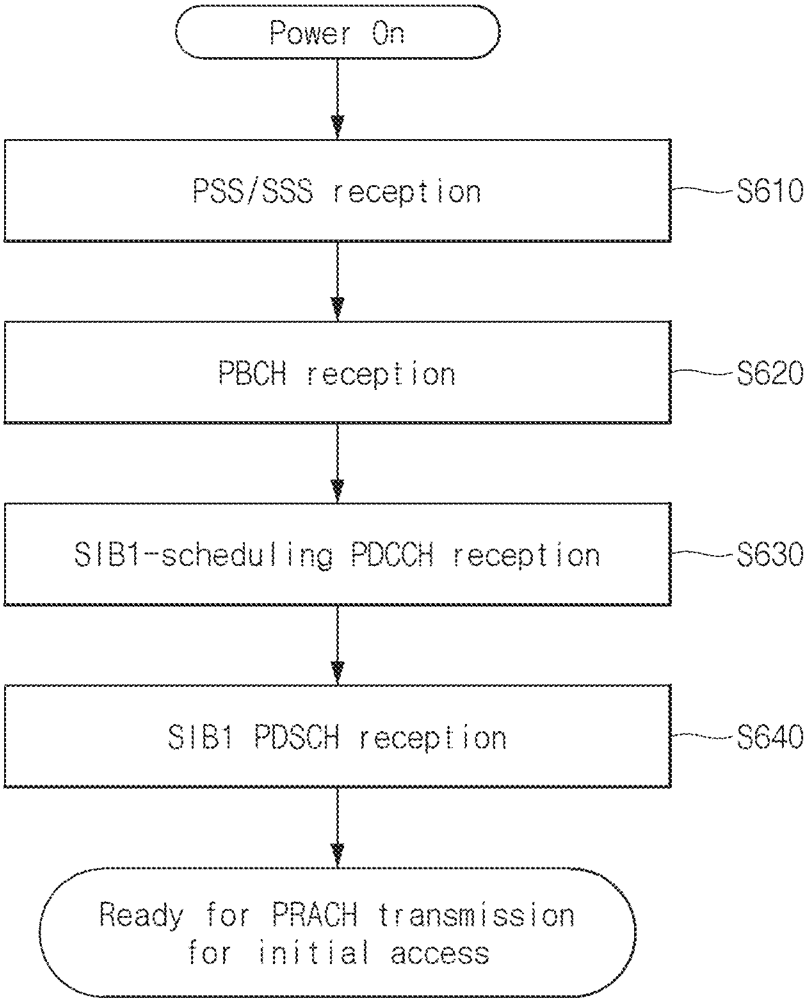
FIG. 6 is a flow chart illustrating reception of DL signals/channels in an initial access procedure to which a method according to an embodiment of the present disclosure is applicable.

FIG. 6 is a flow chart illustrating reception of DL signals/channels in an initial access procedure to which a method according to an embodiment of the present disclosure is applicable. Referring to FIG. 6, a 5G NR UE may receive DL signals/channels in order of S610 to S640 in an initial access procedure. The specific details for the initial access procedure are the same as those described in FIGS. 3 to 5, so duplicate descriptions will be omitted.

The existing NR UE may receive CORESET #0 information via a master information block (MIB) transmitted on a PBCH and receive initial DL signals/channels through CORESET #0 frequency band in the initial access procedure. However, considering the channel BWs shown in Tables 6 and 7 and supportable CORESET #0 bandwidth in the NR standard, the operation according to the above-described conventional method may be inefficient.

The present disclosure proposes the following methods for supporting transmission/reception of a DL broadcast signal/channel for initial access in narrowband.

In the present disclosure, narrowband and NB can be interpreted/applied interchangeably. Further, channel BW, $N_{RB}$, allowed/supported transmission BW, (punctured/non-punctured) PBCH BW, and max transmission BW can be interpreted/applied interchangeably.

In the present disclosure, broadcast signaling further includes a signaling method using PBCH payload generated in the PHY layer, PBCH scrambling sequence, and PBCH DMRS sequence initialization information, in addition to system information including SIB1 and MIB.

In the present disclosure, the broadcast signaling may comprise defining or interpreting differently the existing bit/field. For example, if some of signaling methods based on MIB used for the existing broadcast signaling, PBCH payload generated in the PHY layer in addition to the MIB, and PBCH scrambling sequence and PBCH DMRS sequence initialization information no longer need to be signaled, the broadcast signaling may comprise newly defining and signaling the corresponding bit/field. For example, the broadcast signaling may comprise using subCarrierSpacingCommon in MIB (1 bit, {15 kHz, 30 kHz}) for other 1-bit broadcast signaling purposes usage in a narrowband frequency band supporting only 15 kHz SCS. If PBCH/SIB1/SIB1-scheduling DCI transmission for a new UE is possible without affecting the legacy UE through a frequency band, a dedicated spectrum, a dedicated sync raster, etc., the above-described broadcast signaling may comprise a signaling method performed by newly defining and differently interpreting the bit/field that has been used for broadcast signaling purpose for the existing legacy UE.

Method of Transmitting and Receiving PBCH

In order to support NR DL broadcast signal reception in a narrowband with 5 MHz bandwidth, a subset of PBCH transmission resource blocks (RBs) may be transmitted. In the present disclosure, 'transmitting a subset of PBCH transmission RBs' may mean 'PBCH is transmitted based on a subset of RBs assigned to the PBCH.'

Figure 7:
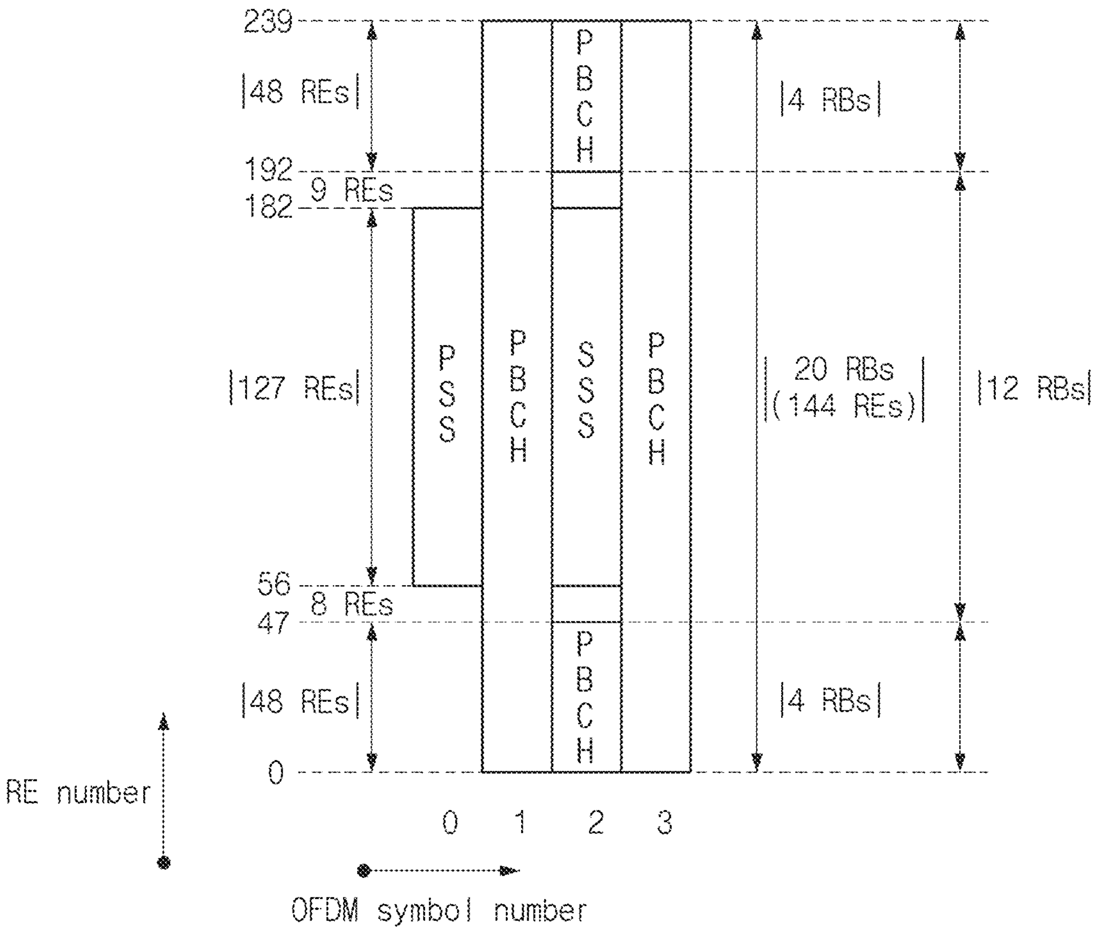
FIG. 7 illustrates an example of a time-frequency structure of SSB according to an embodiment of the present disclosure.

In the present disclosure, the PBCH transmission RBs may refer to RBs related to the PBCH or RBs allocated to the PBCH in a time-frequency structure of SS/PBCH (e.g., see FIG. 7). In the present disclosure, a 'PBCH transmission RB subset' may mean a subset of RBs related to the PBCH or a subset of RBs allocated to the PBCH.

In the present disclosure, PSS/SSS transmission RBs may refer to RBs related to the PSS/SSS or RBs allocated to the PSS/SSS in the time-frequency structure of SS/PBCH (e.g., see FIG. 7).

In the present disclosure, the resource block (RB) may be interpreted/replaced with a physical resource block (PRB) or a common resource block (CRB).

FIG. 7 illustrates an example of a time-frequency structure of SSB according to an embodiment of the present disclosure. For example, the time-frequency structure of SSB may be defined in NR standard.

Specifically, FIG. 7 illustrates the number of REs/the number of RBs in the time-frequency structure of FIG. 4 is added for each domain. Referring to FIG. 7, a frequency domain (bandwidth) for PSS and SSS consists of 127 resource elements (REs). A frequency domain (bandwidth) for PBCH consists of 20 resource blocks (RBs) (=144 REs) or 4 RBs (=48 REs).

For example, a base station may need to exclude or puncture at least five PBCH transmission RBs from PBCH consisting of 20 PRBs and transmit remaining RBs, in order to support PBCH transmission/reception in 3 MHz channel BW stipulated as $N_{RB}$=15 PRBs. That is, the base station may transmit a subset of up to 15 PBCH transmission RBs among a total of 20 PBCH transmission RBs. Further, all the PSS/SSS transmission RBs can be transmitted for the same level of synchronization and measurement performance as the existing NR UE. In this case, the minimum PBCH transmission RBs may be 12 RBs including PSS/SSS.

In the present disclosure, the "punctured" PBCH or the PBCH transmission RB subset means an actual transmitted PBCH after the puncturing application when a subset of PBCH transmission RBs is punctured and transmitted. Therefore, the 'punctured PBCH' and the 'PBCH transmission RB subset' can be interpreted/applied interchangeably.

In 3 MHz channel BW stipulated as $N_{RB}$=15 PRBs as in the above example, the BS/UE may configure the PBCH transmission RB subset using 12 PRBs to 15 PRBs. Methods of configuring a PBCH transmission RB subset respectively using 12 PRBs and 15 PRBs are described in detail below.

[Method #P1]

A method of configuring a PBCH transmission RB subset using 12 PRBs including PSS/SSS may be considered.

The method #P1 is a case in which a PBCH transmission RB subset is configured using only 12 PRBs including PSS/SSS. That is, a PBCH transmission RB subset may be configured using a minimum RB subset including all the PSS/SSS (e.g., FIG. 8). The method #P1 may be efficient when it intends to apply to all of various narrowband channel BWs by defining one punctured PBCH or the PBCH transmission RB subset.

Figure 8:
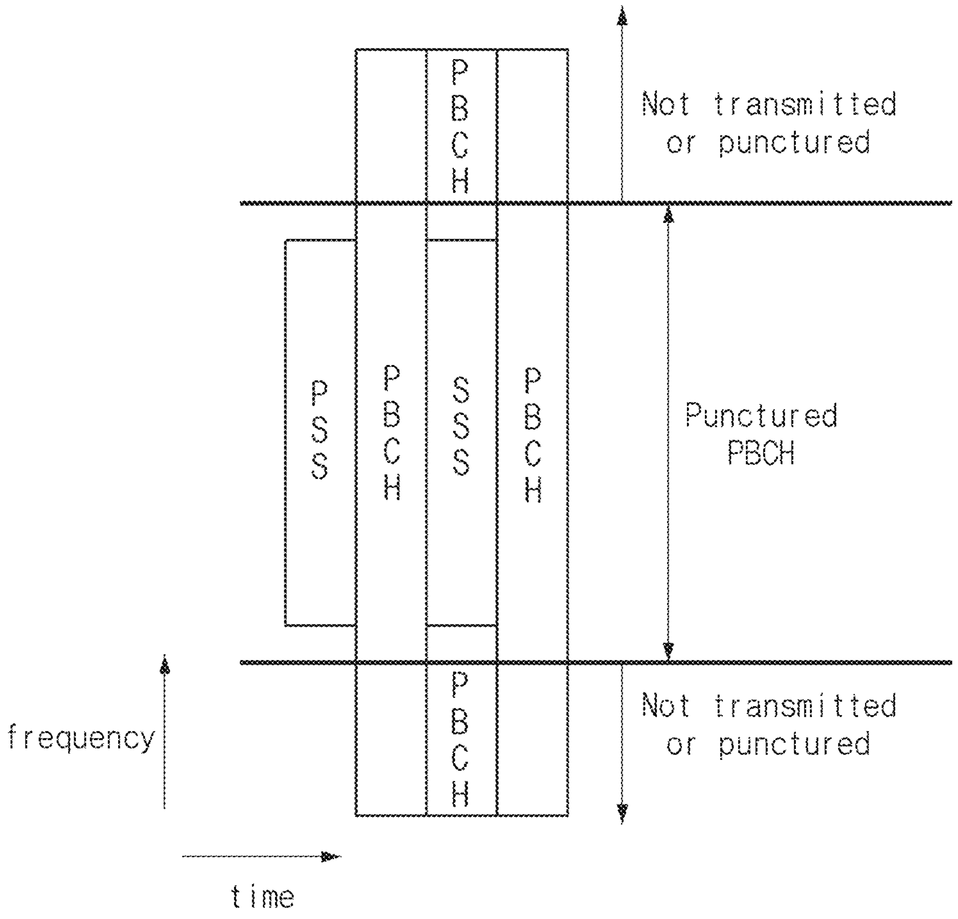
FIG. 8 illustrates an example of a frequency resource domain for PBCH transmission/reception according to an embodiment of the present disclosure.

FIG. 8 illustrates an example of a frequency resource domain for PBCH transmission/reception according to an embodiment of the present disclosure. Specifically, FIG. 8 illustrates an example of a PBCH transmission RB subset based on the method #P1.

[Method #P2]

A method of configuring a PBCH transmission RB subset using 15 PRBs including PSS/SSS may be considered.

The method #P2 is a case in which a PBCH transmission RB subset is configured using 15 PRBs including PSS/SSS.

A PBCH transmission RB subset (i.e., detailed configuration of 15 PRBs) according to an embodiment of the present disclosure may be determined based on one of the following methods #P2-1 to #P2-4.

- Method #P2-1: Center 12 PRB (for PSS/SSS)+lower 3 PRB
- Method #P2-2: Center 12 PRB (for PSS/SSS)+higher 3 PRB
- Method #P2-3: Center 12 PRB (for PSS/SSS)+lower 2 PRB+higher 1 PRB
- Method #P2-4: Center 12 PRB (for PSS/SSS)+higher 2 PRB+lower 1 PRB Due to characteristics of PBCH RE mapping, preferentially transmitting lower RBs of PBCH transmission RBs may be slightly advantageous in terms of performance. Therefore, if other conditions are the same, the method #P2-1 rather than the method #P2-2 may have an advantage in terms of PBCH reception performance. In addition, the method #P2-3 rather than the method #P2-4 may have an advantage in terms of PBCH reception performance.

The methods #P2-1 and P2-2 may be affected in terms of sync performance and measurement performance in a situation, in which there is interference from a contiguous channel/frequency band because the PSS/SSS is exposed to a band edge. If the influence of the interference is expected, the method #P2-3 or the method #2-4 may be considered. In the method #P2-3 or the method #2-4, the PSS/SSS is arranged further inside the channel BW, and thus this method may be to protect the PSS/SSS from the interference from the contiguous channel/frequency band. This is described below with reference to FIG. 9.

Figure 9:
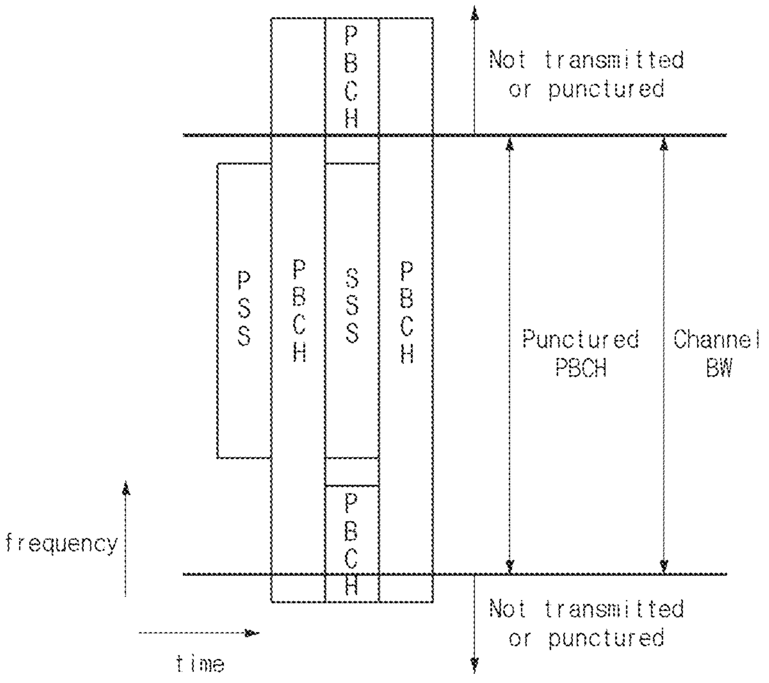
FIG. 9 illustrates an example of a frequency resource domain for PBCH transmission/reception according to another embodiment of the present disclosure.
Figure 9:
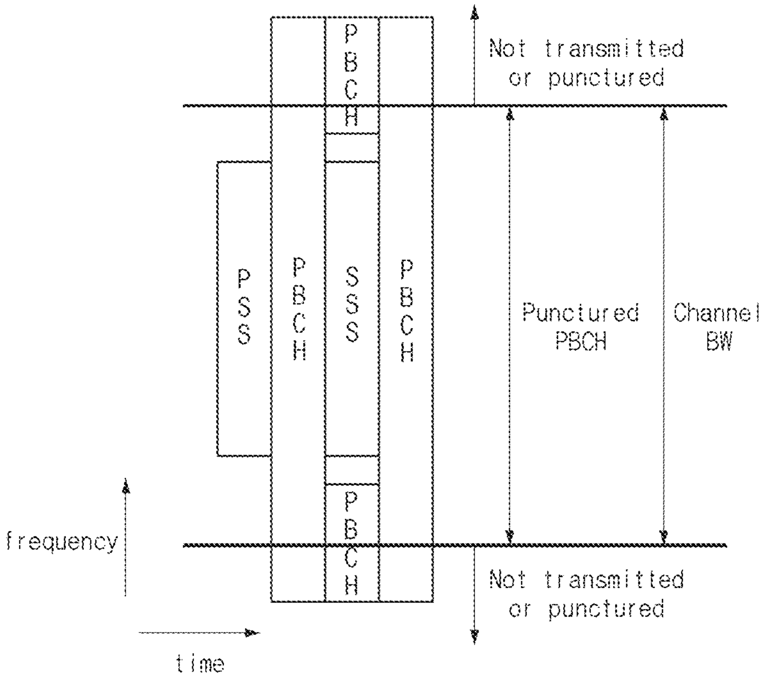

FIG. 9 illustrates an example of a frequency resource domain for PBCH transmission/reception according to another embodiment of the present disclosure.

(a) of FIG. 9 illustrates the method #P2-1. In this case, the PBCH transmission RB subset may include center 12 PRB (for PSS/SSS)+lower 3 PRB.

(b) of FIG. 9 illustrates the method #P2-3. In this case, the PBCH transmission RB subset may include center 12 PRB (for PSS/SSS)+lower 2 PRB+higher 1 PRB.

If the maximum transmission BW defined in the narrowband is $N_{RB}$, the PBCH transmission RB subset based on the method #P2-3/method #P2-4 may be determined as follows.

Method #P2-3: Center 12 PRB+lower ceil [($N_{RB}$-12)/2] PRB+upper floor [($N_{RB}$-12)/2] PRB Method #P2-4: Center 12 PRB+lower floor [($N_{RB}$-12)/2] PRB+upper ceil [($N_{RB}$-12)/2] PRB.

The above-described methods for determining the PBCH transmission RB subset can be implemented/applied as follows.

For example, one of the methods for determining the PBCH transmission RB subset may be fixedly applied to all the narrowband frequency bands.

For example, the methods for determining the PBCH transmission RB subset may be defined/applied per narrowband frequency band. In other words, the methods for determining the PBCH transmission RB subset may be predefined so that they are applied per narrowband frequency band. As a specific example, a table representing the methods for determining the PBCH transmission RB subset applied per narrowband frequency band may be predefined.

For example, the methods for determining the PBCH transmission RB subset may be distinguished based on a dedicated sync raster. In other words, the methods for determining the PBCH transmission RB subset may be determined based on the dedicated sync raster.

For example, the base station may determine one of the methods for determining the PBCH transmission RB subset and may configure/indicate it to the UE via broadcast signaling.

The method(s) for determining the PBCH transmission RB subset may be determined/applied/indicated based on combinations of the examples.

[Method #1]

A method of applying the same punctured PBCH to all narrowband frequency bands may be considered.

According to the method #1, a punctured PBCH determined by the method such as the method #P1 and the method #P2 is applied to all the narrowband frequency bands. For example, the punctured PBCH (briefly, 12-RB PBCH) consisting of 12 PRBs may be defined based on the method #P1. The 12-RB PBCH may be equally applied to both a narrowband in which the channel BW is 12 PRBs and a narrowband in which the channel BW is 15 PRBs.

Since a BS/UE needs to support only one punctured PBCH, there may be an advantage in terms of complexity. However, PBCH performance may be somewhat reduced compared to when a PBCH (e.g., 15 PRBs) consisting of PRBs more than 12 PRBs is supported. This is described below with reference to FIG. 10.

Figure 10:
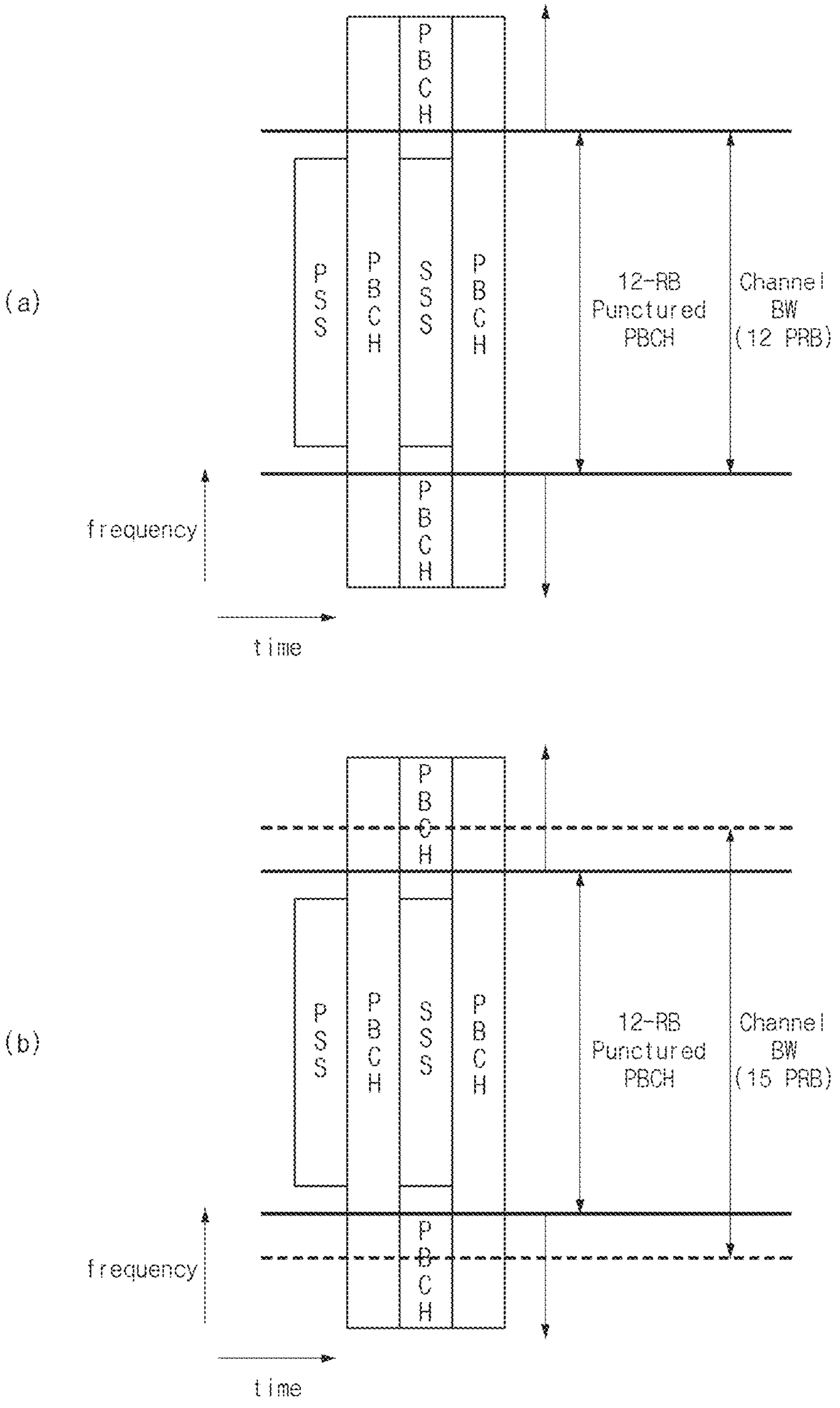
FIG. 10 illustrates an example of an application method of a frequency resource domain for PBCH transmission/reception according to an embodiment of the present disclosure.

FIG. 10 illustrates an example of an application method of a frequency resource domain for PBCH transmission/reception according to an embodiment of the present disclosure. (a) of FIG. 10 illustrates that 12-RB PBCH defined based on the method #P1 is applied to a narrowband in which the channel BW is 12 PRBs. (b) of FIG. 10 illustrates that 12-RB PBCH defined based on the method #P1 is applied to a narrowband in which the channel BW is 15 PRBs.

[Method #2]

A method of defining multiple punctured PBCHs and applying the punctured PBCHs per narrowband (or per carrier BW) may be considered.

According to the method #2, multiple punctured PBCHs are defined based on the method such as the method #P1 and the method #P2, and each of the multiple punctured PBCHs is applied per narrowband or per carrier BW.

For example, 12-RB PBCH and 15-RB PBCH may be defined based on the method #P1 and the method #P2, respectively. If a narrowband channel BW is less than 15 PRBs, the 12-RB PBCH may be applied. If the narrowband channel BW is greater than or equal to 15 PRBs, the 15-RB PBCH may be applied. Because the method #2 needs to support multiple punctured PBCHs compared to the method #1, it may increase the BS/UE complexity. On the other hand, since a PBCH RB subset suitable for the narrowband channel BW is applied, there may be an advantage in terms of PBCH performance. This is described below with reference to FIG. 11.

Figure 11:
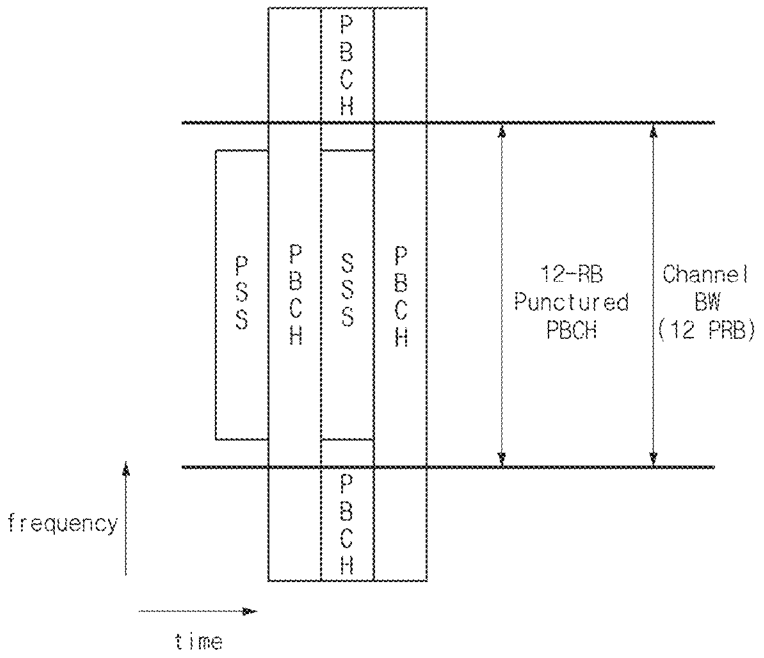
FIG. 11 illustrates an example of an application method of a frequency resource domain for PBCH transmission/reception according to another embodiment of the present disclosure.
Figure 11:
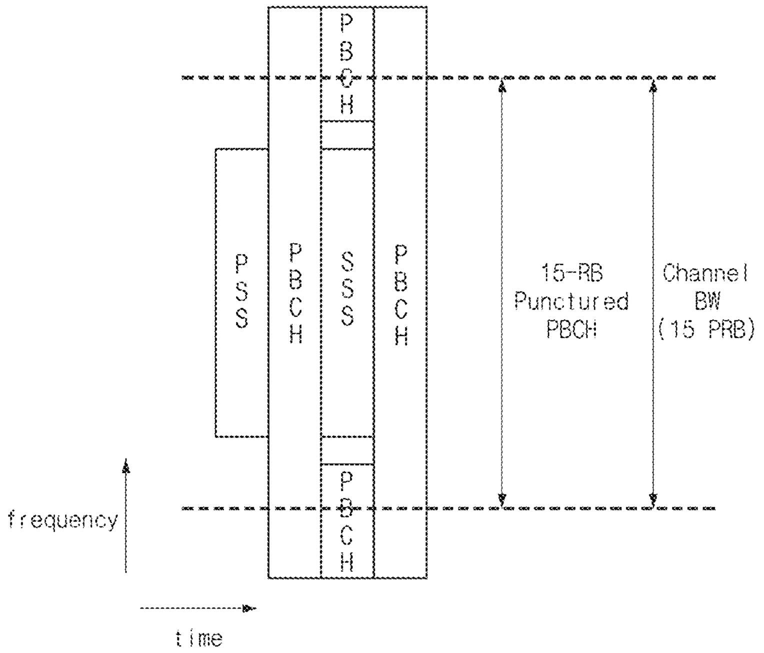

FIG. 11 illustrates an example of an application method of a frequency resource domain for PBCH transmission/reception according to another embodiment of the present disclosure. (a) of FIG. 11 illustrates that 12-RB PBCH defined based on the method #P1 is applied to a narrowband in which the channel BW is 12 PRBs. (b) of FIG. 11 illustrates that 15-RB PBCH defined based on the method #P2 is applied to a narrowband in which the channel BW is 15 PRBs.

[Method #A]

A method of supporting a punctured PBCH based on network configuration may be considered.

The following operation/configuration may be applied to flexibly support the method #1 and the method #2 by the BS selection. A punctured PBCH applied based on a narrowband frequency band or a carrier BW is not fixed, and the punctured PBCH may be determined based on default configuration and/or BS indication. Specifically, a "default" punctured PBCH that the UE basically assumes when receiving SSB in a narrowband may be defined. In fact, punctured PBCH information applied by the base station in the corresponding narrowband frequency band or carrier BW may be indicated to the UE via broadcast signaling. For example, if a channel BW is 15 PRBs, 12-RB PBCH may be defined as the default punctured PBCH. The base station may indicate 12-RB PBCH or 15-RB PBCH to the UE based on the broadcast signaling.

For the above purpose, information indicated by the base station via the broadcast signaling may be information related to the punctured PBCH transmitted in the corresponding narrowband frequency band or carrier BW. In this instance, punctured PBCHs that can be configured by the network (or punctured PBCHs supported by the standard) may be predefined, and one of the predefined punctured PBCHs may be indicated via the broadcast signaling.

Alternatively, the punctured PBCH information transmitted for the above purpose by the broadcast signaling may be information indicating additional PBCH transmission RE/RB(s) transmitted in addition to the default punctured PBCH that the UE assumes before the broadcast signaling. For example, it may be assumed that the default punctured PBCH is 12-RB PBCH and the actually transmitted punctured PBCH is 15-RB PBCH. The punctured PBCH information transmitted based on the broadcast signaling may indicate an additional punctured PBCH transmission RB value of 3.

Further, broadcast signaling information (punctured PBCH information) may include information on a location to which the additional punctured PBCH transmission RB(s) is transmitted. In this case, in the above example, the broadcast signaling information (punctured PBCH information) may include i) the additional punctured PBCH RB value of 3 and ii) information representing a location related to the additional punctured PBCH transmission RB(s). For example, the information representing the location may represent whether the corresponding punctured PBCH is transmitted adjacent to a smallest RB index or transmitted adjacent to a largest RB index.

In the method #A, the UE may assume the default punctured PBCH and receive the PBCH in all narrowband frequency band(s) or narrowband frequency band(s) predefined in the standard. If the UE acquires the additional or actual transmitted punctured PBCH information via the broadcast signaling, the UE may receive the punctured PBCH based on the corresponding broadcast signaling information.

Information such as CORESET #0 BW and initial DL BWP may be transmitted through the method of indicating the punctured PBCH via the broadcast signaling in the method #A. Further, the CORESET #0 BW, the initial DL BWP, etc. may be determined by the punctured PBCH indicated via the broadcast signaling in the method #A. For example, the punctured PBCH indicated based on the method #A may be applied to the CORESET #0 BW and/or the initial DL BWP.

A new UE supporting a narrowband operation may be required to mandatorily support all punctured PBCH(s) defined/introduced for narrowband BS/UE operation. For example, if the 12-RB PBCH and the 15-RB PBCH are supported, the new UE supporting the narrowband operation may be required to mandatorily support both the 12-RB PBCH and the 15-RB PBCH.

Alternatively, the new UE supporting the narrowband operation may be allowed to selectively support the punctured PBCH(s) defined/introduced for the narrowband BS/UE operation. For example, the above-described default punctured PBCH may be mandatorily supported, and the additionally supported punctured PBCH(s) may be selectively supported. The UE requirements may be defined per narrowband frequency band.

In relation to the frequency resource domain, operation/configuration based on the following Table 8 is defined.

TABLE 8

| |
|---|
| Considering that the UE may not be able to support a wide bandwidth to be supported in the NR system at one time, the UE may be configured to operate in a part of a frequency bandwidth of a cell (hereinafter, referred to as a bandwidth part (BWP)). |
| Resource blocks of the NR system include physical resource blocks defined in the bandwidth part and common resource blocks that are numbered from 0 and upwards in the frequency domain for subcarrier spacing configuration μ. |
| Point A is obtained as follows. |
| offsetToPointA for a PCell downlink represents a frequency offset between point A and the lowest subcarrier of the lowest resource block that overlaps with the SS/PBCH block used by the UE for initial cell selection, and is expressed in units of resource blocks assuming 15 kHz subcarrier spacing for FR1 and 60 kHz subcarrier spacing for FR2; |
| absoluteFrequencyPointA for all other cases represents the frequency-location of point A expressed as in absolute radio-frequency channel number (ARFCN). |

This is described below with reference to FIG. 12.

Figure 12:
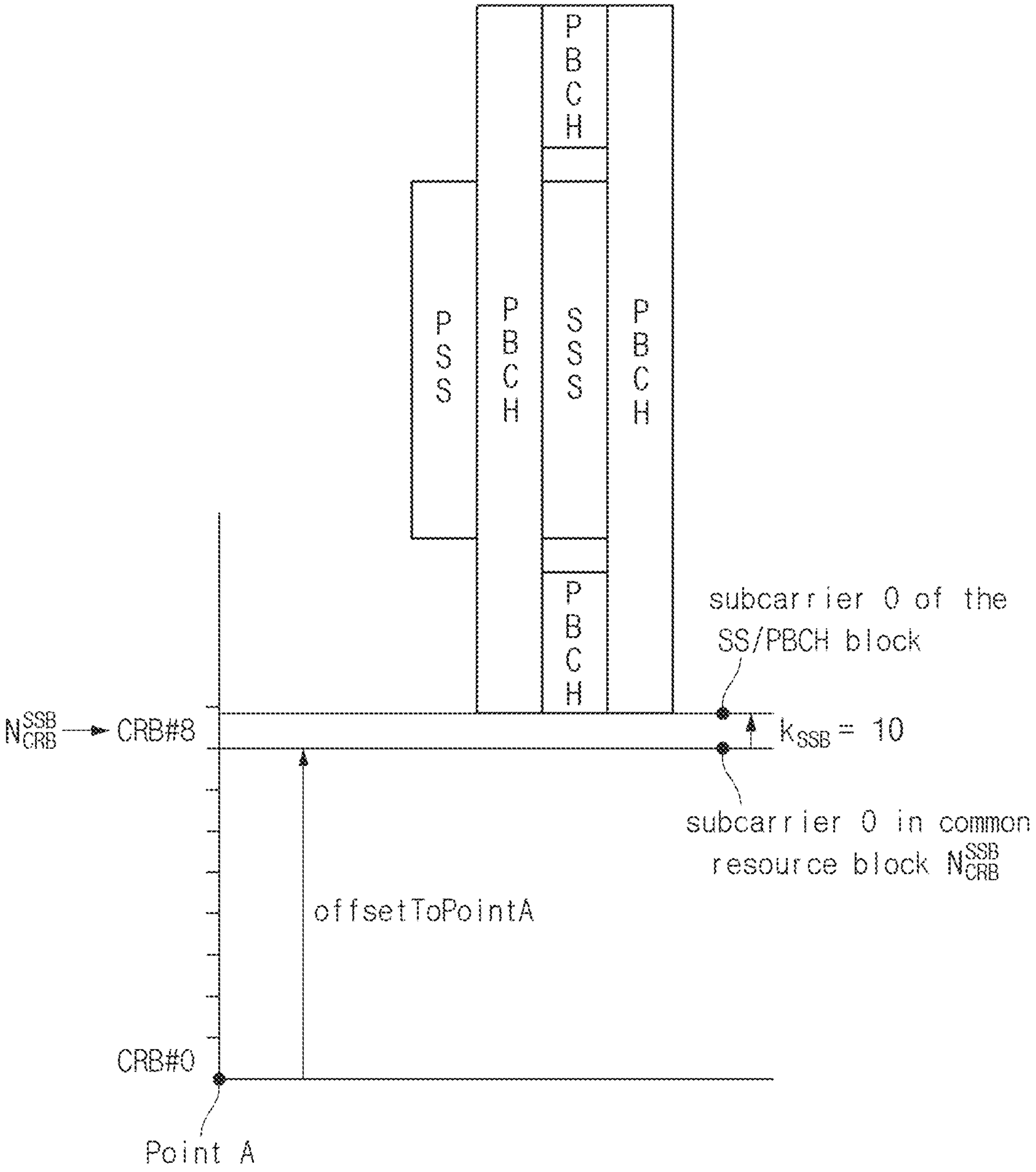
FIG. 12 illustrates point A according to an existing method.

FIG. 12 illustrates point A according to the existing method. Specifically, FIG. 12 illustrates offsetToPointA based on Table 8. Referring to FIG. 12, offsetToPointA represents a frequency offset between point A and the lowest subcarrier (subcarrier 0) of the lowest resource block (CRB #8) that overlaps with the SS/PBCH block. $k_{SSB}$ represents a subcarrier offset between the lowest subcarrier number (subcarrier 0) of the SS/PBCH block and subcarrier 0 in common resource block $$(N_{CRB}^{SSB}),$$

where the common resource block $$(N_{CRB}^{SSB})$$

is obtained from offsetToPointA. That is, the common resource block $$(N_{CRB}^{SSB})$$

may be a lowest resource block that overlaps with the SS/PBCH block based on offsetToPointA.

$k_{SSB}$ may be indicated by parameter ssb-SubcarrierOffset within a system information block (e.g., MIB). For example, $k_{SSB}$ may be indicated by one integer among 0 to 15. If the parameter ssb-SubcarrierOffset is not provided, $k_{SSB}$ may be derived from a frequency difference between the SS/PBCH block and point A.

As in [Method #P1 of configuring a PBCH transmission RB subset using 12 PRBs including PSS/SSS] or [Method #P2 of configuring a PBCH transmission RB subset using 15 PRBs including PSS/SSS] proposed above, it may be assumed that the entire SSB is not received due to the PBCH puncturing. In this instance, point A may be determined as follows.

The UE may determine offsetToPointA for PCell downlink for obtaining point A based on the SSB. The SSB may be based on i) (actual) received SSB (SS/PBCH block)/(actual) transmitted SSB (SS/PBCH block) and/or ii) (if SSB/PBCH puncturing is applied) the punctured SSB (SS/PBCH block)/SSB (SS/PBCH block) after puncturing.

Point A may be obtained based on the SSB (SS/PBCH block) as follows.

offsetToPointA for a PCell downlink represents a frequency offset between point A and the lowest subcarrier of the lowest resource block that overlaps with the SS/PBCH block used by the UE for initial cell selection, and is expressed in units of resource blocks assuming 15 kHz subcarrier spacing for FR1 and 60 kHz subcarrier spacing for FR2;

absoluteFrequencyPointA for all other cases represents the frequency-location of point A expressed as in absolute radio-frequency channel number (ARFCN).

Alternatively, in this case, the existing defined operation for obtaining point A of the UE may be modified as in Table 9 below.

TABLE 9

| |
|---|
| 4.4.4 Resource blocks |
| 4.4.4.1 General |
| A resource block is defined as $N_{sc}^{RB} = 12$ consecutive subcarriers in the frequency domain. |
| 4.4.4.2 Point A |
| Point A serves as a common reference point for resource block grids and is obtained from: |
| offsetToPointA for a PCell downlink where offsetToPointA represents the frequency offset |

TABLE 9-continued

| |
|---|
| between point A and the lowest subcarrier of the lowest resource block, which overlaps with the SS/PBCH block after puncturing, if any, used by the UE for initial cell selection, expressed in units of resource blocks assuming 15 kHz subcarrier spacing for FR1 and 60 kHz subcarrier spacing for FR2; |
| for operation without shared spectrum channel access in FRI and FR2-1, the lowest resource block has the subcarrier spacing provided by the higher layer parameter subCarrierSpacingCommon; |
| for operation with shared spectrum channel access in FRI or FR2, and for operation without shared spectrum channel access in FR2-2, the lowest resource block has the subcarrier spacing same as the SS/PBCH block used by the UE for initial cell selection; |
| absoluteFrequencyPointA for all other cases where absoluteFrequencyPointA represents the frequency-location of point A expressed as in ARFCN. |

This is described below with reference to FIG. 13.

Figure 13:
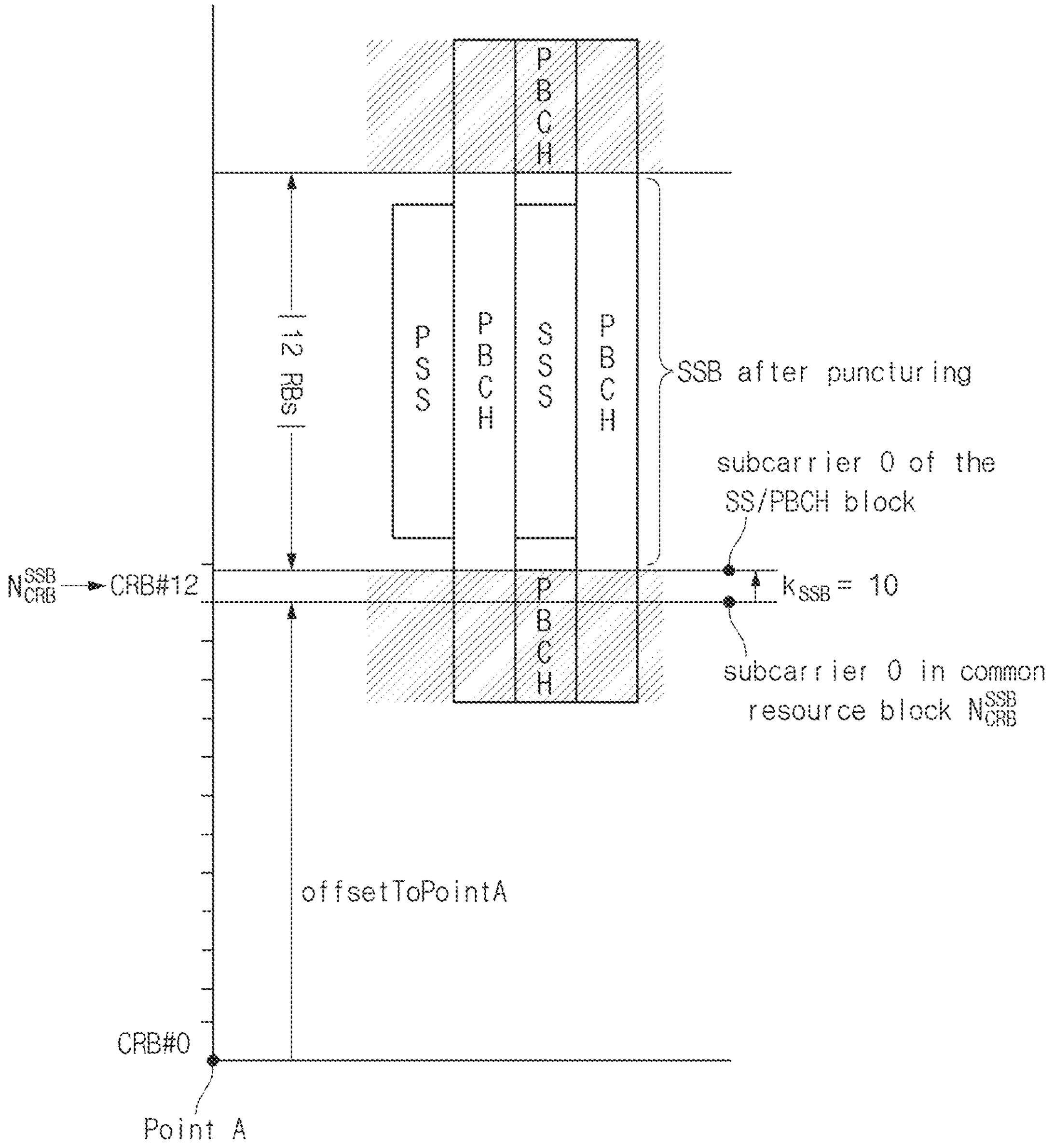
FIG. 13 illustrates point A according to an embodiment of the present disclosure.

FIG. 13 illustrates point A according to an embodiment of the present disclosure. Descriptions overlapping with Table 8 and FIG. 12 are omitted. Referring to FIG. 13, the SS/PBCH block after puncturing may consist of 12 resource blocks. According to an embodiment of the present disclosure, offsetToPointA represents the frequency offset between point A and the lowest subcarrier (subcarrier 0) of the lowest resource block (CRB #12) which overlaps with the SS/PBCH block after puncturing.

The puncturing can be applied/interpreted by being replaced with truncation.

From an implementation perspective, operations (e.g., operations based on at least one of the method #P1, the method #P2, the method #1, the method #2, or the method #A) of the UE/BS according to the above-described embodiments can be processed by a device (e.g., processors 110 and 210 of FIG. 16) of FIG. 16 to be described below.

Figure 16:
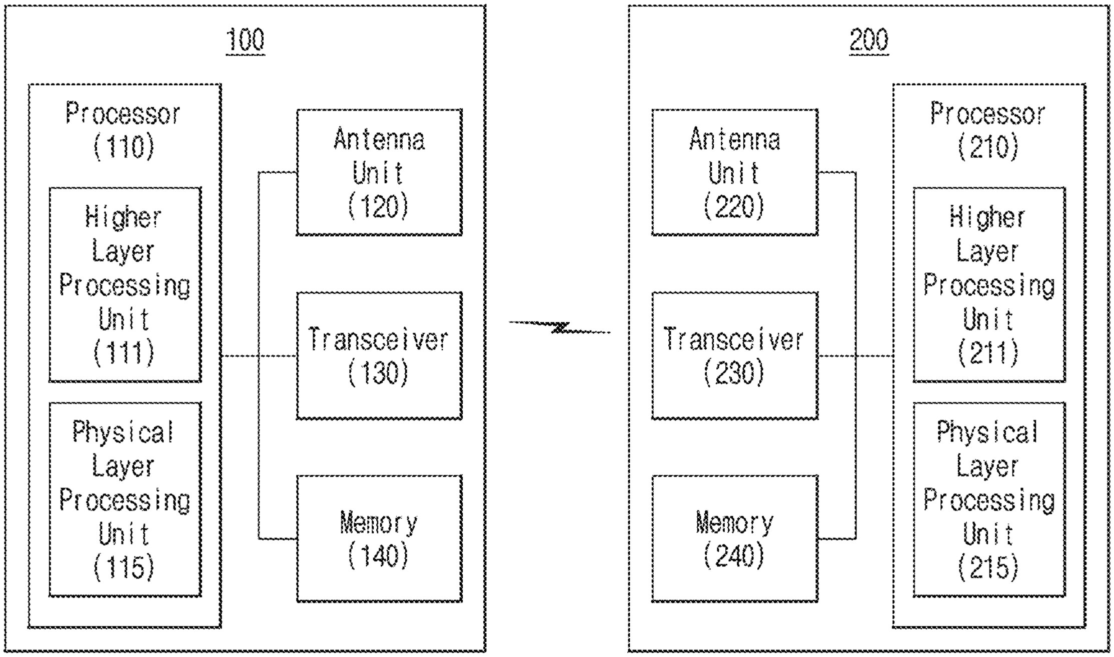
FIG. 16 illustrates configuration of a first device and a second device according to an embodiment of the present disclosure.

Further, the operations (e.g., operations based on at least one of the method #P1, the method #P2, the method #1, the method #2, or the method #A) of the UE/BS according to the above-described embodiments can be stored in a memory (e.g., memories 140 and 240 of FIG. 16) in the form of commands/programs (e.g., instructions, executable codes) for running at least one processor (e.g., processors 110 and 210 of FIG. 16).

Below, the above-described embodiments are described in detail from a UE/BS operation perspective with reference to FIGS. 14 and 15. Methods described below are merely distinguished for convenience of explanation. Thus, it is obvious that partial configuration of any method can be substituted or combined with partial configuration of another method.

Figure 14:
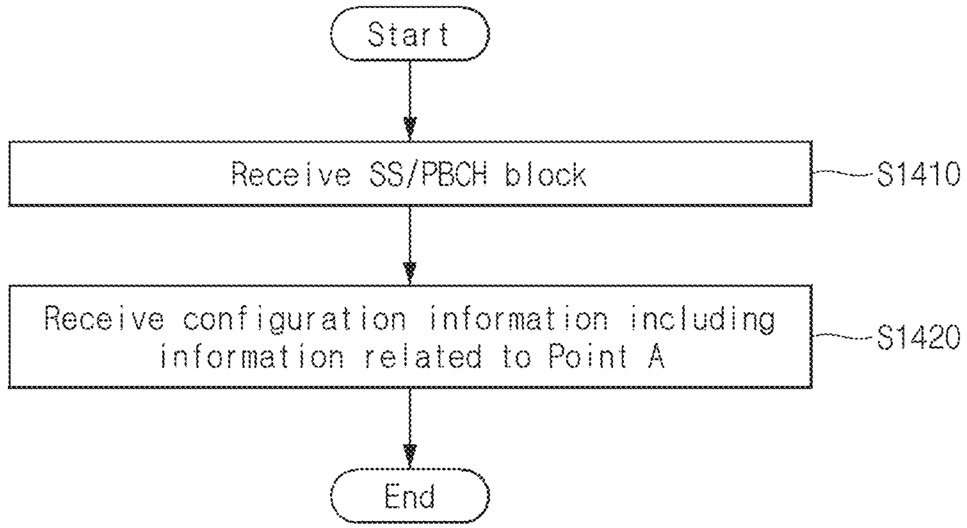
FIG. 14 is a flow chart illustrating a method performed by a user equipment according to an embodiment of the present disclosure.

FIG. 14 is a flow chart illustrating a method performed by a UE according to an embodiment of the present disclosure.

Referring to FIG. 14, a method performed by a UE according to an embodiment of the present disclosure comprises a step S1410 of receiving an SS/PBCH block and a step S1420 of receiving configuration information including information related to Point A.

In the step S1410, the UE receives a synchronization signal/physical broadcast channel (SS/PBCH) block from a base station (BS).

For example, the SS/PBCH block may be an SS/PBCH block after puncturing based on at least one of the above-described embodiments.

In the step S1420, the UE receives, from the base station, configuration information including information related to point A.

For example, the information related to point A may represent parameter offsetToPointA.

A time-frequency structure of the SS/PBCH block and the point A may be based on at least one of the method #P1, the method #P2, the method #1, the method #2, or the method #A described above. Embodiments related to this are described in detail below.

According to an embodiment, based on the information (e.g., parameter offsetToPointA) related to the point A, a frequency offset between i) the point A and ii) a lowest subcarrier of a lowest resource block overlapping with the SS/PBCH block may be determined. A time-frequency structure (e.g., see FIGS. 8 to 11 and FIG. 13) related to the SS/PBCH block may be based on puncturing. The lowest subcarrier of the lowest resource block may overlap with the SS/PBCH block after the puncturing.

According to an embodiment, the SS/PBCH block after the puncturing may include 12 or 15 resource blocks.

The 12 resource blocks may be remaining resource blocks excluding 8 resource blocks from 20 resource blocks based on a time-frequency structure of the existing SS/PBCH (e.g., see FIG. 7). Specifically, the 12 resource blocks may be remaining resource blocks other than subcarriers based on subcarrier numbers 0 to 47 and 192 to 239 among subcarriers based on subcarrier numbers 0 to 239 in 4 orthogonal frequency division multiplexing (OFDM) symbols.

A channel bandwidth related to a cell search based on the SS/PBCH block may be less than 5 MHz. For example, the channel bandwidth may be 3 MHz.

Common resource blocks/physical resource blocks and resource block grids may be defined/determined based on the point A. This is described in detail below.

For example, one resource block may be defined as 12 consecutive subcarriers in a frequency domain. A common reference point of resource block grids may be based on the Point A.

For example, common resource blocks (CRBs) may be numbered from 0 and upward in a frequency domain. A center of subcarrier 0 of CRB 0 may coincide with the Point A. The lowest resource block may be a CRB (e.g., CRB #12 of FIG. 13) that overlaps with subcarrier 0 of a lowest resource block of the SS/PBCH block after the puncturing.

For example, physical resource blocks (PRBs) may be defined within a bandwidth part (BWP) which is based on a subset of the CRBs (e.g., a subset of consecutive CRBs). A CRB number related to a PRB number may be determined based on a sum of i) the PRB number and ii) a CRB number where the BWP starts based on the CRB 0. As a specific example, if the BWP starts from CRB 2, CRB number related to PRB 3 may be 5. That is, the resource block may be identified/referred to as CRB or PRB. Specifically, the resource block may be identified based on the CRB number, and if the resource block is within the BWP, the resource block may be identified based on the PRB number.

According to an embodiment, the SS/PBCH block after the puncturing may be used by the UE for the initial cell selection.

According to an embodiment, the configuration information may be received based on a broadcast signaling. Specifically, the configuration information may be based on a system information block (SIB) (e.g., SIB1). As a specific example, the configuration information may be based on parameter FrequencyInfoDL-SIB based on SIB1. The parameter Frequency InfoDL-SIB may include the parameter offsetToPointA. More specifically, the SIB1 may include parameter ServingCellConfigCommonSIB, the parameter ServingCellConfigCommonSIB may include parameter DownlinkConfigCommonSIB, and the parameter DownlinkConfigCommonSIB may include the parameter Frequency InfoDL-SIB.

The method may further comprise a step of receiving information related to the SS/PBCH block. In this step, the UE may receive information related to the SS/PBCH block from the base station. The present embodiment may be based on the method #A. The information related to the SS/PBCH block may be received based on broadcast signaling.

For example, the information related to the SS/PBCH block may include information on at least one of i) a number of resource blocks (e.g., the number of RBs (3), in which SS/PBCH is transmitted, in addition to 12, 15, or the number of default RBs (12)) related to the SS/PBCH block after the puncturing and/or ii) a location related to the resource blocks (e.g., a frequency location of the SS/PBCH block or a frequency location of additional RBs).

For example, based on before the information related to the SS/PBCH block is received, a number of resource blocks related to the SS/PBCH block after the puncturing may be determined based on a default configuration. As a specific example, based on the default configuration, the number of resource blocks related to the SS/PBCH block after the puncturing may be determined as 12. The UE may receive, from the base station, the SS/PBCH block in 12 resource blocks.

Operations based on the steps S1410 and S1420 and the step of receiving the information related to the SS/PBCH block may be implemented by a device of FIG. 16. For example, a UE 200 may control one or more transceivers 230 and/or one or more memories 240 so as to perform the operations based on the steps S1410 and S1420 and the step of receiving the information related to the SS/PBCH block.

Below, the above-described embodiments are described in detail from a BS operation perspective.

Steps S1510 and S1520 and a step of transmitting information related to SS/PBCH block described below correspond to the steps S1410 and S1420 and the step of receiving the information related to the SS/PBCH block described with reference to FIG. 14. Considering the above correspondence, redundant description is omitted. That is, a detailed description of the BS operation described below can be replaced with the description/embodiment of FIG. 14 corresponding to the BS operation.

Figure 15:
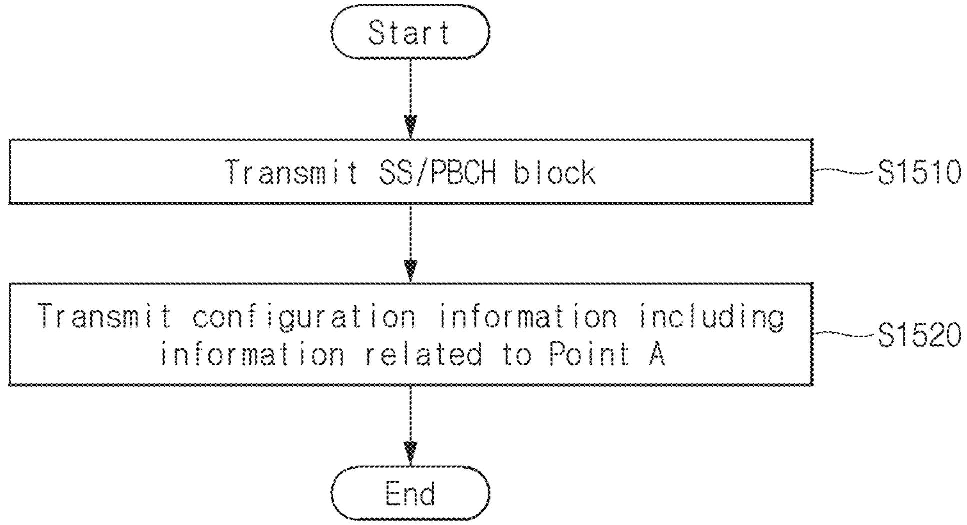
FIG. 15 is a flow chart illustrating a method performed by a base station according to another embodiment of the present disclosure.

FIG. 15 is a flow chart illustrating a method performed by a base station according to another embodiment of the present disclosure.

Referring to FIG. 15, a method performed by a base station according to another embodiment of the present disclosure comprises a step S1510 of transmitting an SS/PBCH block and a step S1520 of transmitting configuration information including information related to Point A.

In the step S1510, the base station transmits a synchronization signal/physical broadcast channel (SS/PBCH) block to a UE.

In the step S1520, the base station transmits, to the UE, configuration information including information related to point A.

The method may further comprise a step of transmitting information related to the SS/PBCH block. In this step, the base station may transmit information related to the SS/PBCH block to the UE.

Operations based on the steps S1510 and S1520 and the step of transmitting the information related to the SS/PBCH block may be implemented by a device of FIG. 16. For example, a base station 100 may control one or more transceivers 130 and/or one or more memories 140 so as to perform the operations based on the steps S1510 and S1520 and the step of transmitting the information related to the SS/PBCH block.

A device to which an embodiment of the present disclosure is applicable (a device implementing the method/operation according to an embodiment of the present disclosure) is described below with reference to FIG. 16.

FIG. 16 illustrates configuration of a first device and a second device according to an embodiment of the present disclosure.

A first device 100 may include a processor 110, an antenna unit 120, a transceiver 130, and a memory 140.

The processor 110 may perform baseband-related signal processing and include a higher layer processing unit 111 and a physical layer processing unit 115. The higher layer processing unit 111 may process operations of the MAC layer, the RRC layer, or higher layers. The physical layer processing unit 115 may process the operation of the PHY layer. For example, if the first device 100 is a base station (BS) device in BS-UE communication, the physical layer processing unit 115 may perform uplink reception signal processing, downlink transmission signal processing, and the like. For example, if the first device 100 is a first UE device in inter-UE communication, the physical layer processing unit 115 may performs downlink reception signal processing, uplink transmission signal processing, sidelink transmission signal processing, and the like. The processor 110 may control the overall operation of the first device 100 in addition to performing the baseband-related signal processing.

The antenna unit 120 may include one or more physical antennas and support MIMO transmission/reception if the antenna unit 120 includes a plurality of antennas. The transceiver 130 may include a radio frequency (RF) transmitter and an RF receiver. The memory 140 may store information processed by the processor 110 and software, operating systems, and applications related to the operation of the first device 100. The memory 140 may also include components such as a buffer.

The processor 110 of the first device 100 may be configured to implement the operation of the BS in the BS-UE communication (or the operation of the first UE device in the inter-UE communication) in embodiments described in the present disclosure.

The second device 200 may include a processor 210, an antenna unit 220, a transceiver 230, and a memory 240.

The processor 210 may perform baseband-related signal processing and include a higher layer processing unit 211 and a physical layer processing unit 215. The higher layer processing unit 211 may process the operation of the MAC layer, the RRC layer, or higher layers. The physical layer processing unit 215 may process the operation of the PHY layer. For example, if the second device 200 is a UE device in BS-UE communication, the physical layer processing unit 215 may perform downlink reception signal processing, uplink transmission signal processing, and the like. For example, if the second device 200 is a second UE device in inter-UE communication, the physical layer processing unit 215 may perform downlink reception signal processing, uplink transmission signal processing, sidelink reception signal processing, and the like. The processor 210 may control the overall operation of the second device 210 in addition to performing the baseband-related signal processing.

The antenna unit 220 may include one or more physical antennas and support MIMO transmission/reception if the antenna unit 220 includes a plurality of antennas. The transceiver 230 may include an RF transmitter and an RF receiver. The memory 240 may store information processed by the processor 210 and software, operating systems, and applications related to the operation of the second device 200. The memory 240 may also include components such as a buffer.

The processor 210 of the second device 200 may be configured to implement the operation of the UE in the BS-UE communication (or the operation of the second UE device in the inter-UE communication) in embodiments described in the present disclosure.

The descriptions for the BS and the UE in the BS-UE communication (or the first UE device and the second UE device in the inter-UE communication) in the examples of the present disclosure can be equally applied to the operations of the first device 100 and the second device 200, and redundant descriptions are omitted.

The wireless communication technology implemented in the devices 100 and 200 according to the present disclosure may further include narrowband Internet of Things (NB-IoT) for low-power communication in addition to LTE, NR, and 6G. For example, the NB-IoT technology may be an example of a low power wide area network (LPWAN) technology and may be implemented in standards such as LTE Cat NB1 and/or LTE Cat NB2. The NB-IoT technology is not limited to the above-described names.

Additionally or alternatively, the wireless communication technology implemented in the devices 100 and 200 according to the present disclosure may perform communication based on LTE-M technology. For example, the LTE-M technology may be an example of the LPWAN technology, and may be called by various names such as enhanced machine type communication (eMTC). For example, the LTE-M technology may be implemented with at least one of various standards such as 1) LTE CAT 0, 2) LTE Cat M1, 3) LTE Cat M2, 4) LTE non-BL (non-Bandwidth Limited), 5) LTE-MTC, 6) LTE machine type communication, and/or 7) LTE M. The LTE-M technology is not limited to the above-mentioned names.

Additionally or alternatively, the wireless communication technology implemented in the devices 100 and 200 according to the present disclosure may include at least one of ZigBee, Bluetooth, and low power wide area network (LP-WAN) in consideration of low power communication, and is not limited to the above-mentioned names. For example, the ZigBee technology may create personal area networks (PAN) related to small/low-power digital communication based on various standards such as IEEE 802.15.4, and may be called by various names.

The invention claimed is:

1. A method performed by a user equipment (UE) comprising:

receiving a Synchronization Signal/Physical Broadcast CHannel (SS/PBCH) block; and receiving configuration information including information related to a Point A, wherein, based on the information related to the Point A, a frequency offset between i) the Point A and ii) a lowest subcarrier of a lowest resource block overlapping with the SS/PBCH block is determined, wherein a time-frequency structure related to the SS/PBCH block is based on a puncturing, and wherein the lowest subcarrier of the lowest resource block overlaps with the SS/PBCH block after the puncturing.

2. The method of claim 1, wherein the SS/PBCH block after the puncturing includes 12 or 15 resource blocks.

3. The method of claim 2, wherein the 12 resource blocks are remaining blocks other than subcarriers based on subcarrier numbers 0 to 47 and 192 to 239 among subcarriers based on subcarrier numbers 0 to 239 in 4 Orthogonal Frequency Division Multiplexing (OFDM) symbols.

4. The method of claim 3, wherein a channel bandwidth related to a cell search based on the SS/PBCH block is smaller than 5 MHz.

5. The method of claim 1, wherein one resource block is defined as 12 consecutive subcarriers in a frequency domain, and wherein a common reference point of resource block grids is based on the Point A.

6. The method of claim 1, wherein the SS/PBCH block after the puncturing is used by the UE for an initial cell selection.

7. The method of claim 1, wherein Common Resource Blocks (CRBs) are numbered from 0 and upward in a frequency domain, and wherein a center of a subcarrier 0 of a CRB 0 coincides with the Point A.

8. The method of claim 7, wherein the lowest resource block is a CRB that overlaps with a subcarrier 0 of a lowest resource block of the SS/PBCH block after the puncturing.

9. The method of claim 7, wherein Physical Resource Blocks (PRBs) are defined within a BandWidth Part (BWP) which is based on a subset of the CRBs.

10. The method of claim 9, wherein a CRB number related to a PRB number is determined based on a sum of i) the PRB number and ii) a CRB number where the BWP starts based on the CRB 0.

11. The method of claim 1, further comprising:

receiving information related to the SS/PBCH block, wherein the information related to the SS/PBCH block is received based on a broadcast signaling.

12. The method of claim 11, wherein the information related to the SS/PBCH block includes information on at least one of i) a number of resource blocks related to the SS/PBCH block after the puncturing and/or ii) a location related to the resource blocks.

13. The method of claim 11, wherein, based on before the information related to the SS/PBCH block is received, a number of resource blocks related to the SS/PBCH block after the puncturing is determined based on a default configuration.

14. A user equipment (UE) comprising:

one or more transceivers;

one or more processors; and one or more memories connected to the one or more processors and configured to store instructions, wherein the instructions, based on being executed by the one or more processors, configure the one or more processors to perform operations comprising:

receiving a Synchronization Signal/Physical Broadcast CHannel (SS/PBCH) block; and receiving configuration information including information related to a Point A, wherein, based on the information related to the Point A, a frequency offset between i the Point A and ii) a lowest subcarrier of a lowest resource block overlapping with the SS/PBCH block is determined, wherein a time-frequency structure related to the SS/PBCH block is based on a puncturing, and wherein the lowest subcarrier of the lowest resource block overlaps with the SS/PBCH block after the puncturing.

15. A base station operating in a wireless communication, the base station comprising:

one or more transceivers;

one or more processors; and one or more memories connected to the one or more processors and configured to store instructions, wherein the instructions, based on being executed by the one or more processors, configure the one or more processors to perform operations comprising:

transmitting a Synchronization Signal/Physical Broadcast CHannel (SS/PBCH) block; and transmitting configuration information including information related to a Point A, wherein, based on the information related to the Point A, a frequency offset between i the Point A and ii) a lowest subcarrier of a lowest resource block overlapping with the SS/PBCH block is determined, wherein a time-frequency structure related to the SS/PBCH block is based on a puncturing, and wherein the lowest subcarrier of the lowest resource block overlaps with the SS/PBCH block after the puncturing.

* * * * *